United States Patent
Saito

(10) Patent No.: US 12,066,597 B2
(45) Date of Patent: Aug. 20, 2024

(54) IMAGING LENS AND IMAGING APPARATUS

(71) Applicant: FUJIFILM Corporation, Tokyo (JP)

(72) Inventor: Hiroki Saito, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 275 days.

(21) Appl. No.: 17/365,917

(22) Filed: Jul. 1, 2021

(65) Prior Publication Data

US 2022/0011542 A1    Jan. 13, 2022

(30) Foreign Application Priority Data

Jul. 10, 2020   (JP) ................. 2020-119264

(51) Int. Cl.
*G02B 13/00* (2006.01)
*G02B 9/04* (2006.01)
*G02B 9/12* (2006.01)

(52) U.S. Cl.
CPC ........... *G02B 13/0035* (2013.01); *G02B 9/04* (2013.01); *G02B 9/12* (2013.01); *G02B 13/003* (2013.01)

(58) Field of Classification Search
CPC .. G02B 13/00; G02B 13/003; G02B 13/0035; G02B 13/0015; G02B 13/04; G02B 13/006; G02B 13/0045; G02B 13/18; G02B 9/04; G02B 9/06; G02B 9/12; G02B 9/20; G02B 9/64; G02B 9/24; G02B 9/32; G02B 27/646; G02B 7/04
USPC ........ 359/791–794, 796, 786–788, 784, 691, 359/689
See application file for complete search history.

(56) References Cited

U.S. PATENT DOCUMENTS

| | | | |
|---|---|---|---|
| 2014/0063624 A1* | 3/2014 | Morooka | G02B 13/02 359/740 |
| 2016/0282590 A1 | 9/2016 | Saito et al. | |
| 2018/0131874 A1 | 5/2018 | Tamura et al. | |

FOREIGN PATENT DOCUMENTS

| | | |
|---|---|---|
| JP | H08-248312 A | 9/1996 |
| JP | 2010-113248 A | 5/2010 |
| JP | 2012-108278 A | 6/2012 |
| JP | 2016-180851 A | 10/2016 |
| JP | 2019-101180 A | 6/2019 |
| JP | 2021-124630 A | 8/2021 |
| WO | 2016/167063 A1 | 10/2016 |
| WO | WO-2019073744 A1 * | 4/2019 ............. G02B 13/04 |

OTHER PUBLICATIONS

English translation of WO-2019073744. (Year: 2019).*
(Continued)

*Primary Examiner* — Jie Lei
(74) *Attorney, Agent, or Firm* — Studebaker & Brackett PC

(57) ABSTRACT

The imaging lens includes, successively in order from a position closest to an object side to an image side: a first lens group; and a second lens group that has a positive refractive power. During focusing, only the second lens group moves. A lens closest to the image side in the second lens group is a negative meniscus lens having a surface convex toward the object side. Assuming that a paraxial radius of curvature of an object side surface of the negative meniscus lens closest to the image side in the second lens group is rF, and a maximum image height is Y, the imaging lens satisfies Conditional Expression (1), which is represented by 0.5<rF/Y<3 (1).

19 Claims, 14 Drawing Sheets

EXAMPLE 1

(56) References Cited

OTHER PUBLICATIONS

An Office Action; "Notice of Reasons for Refusal," mailed by the Japanese Patent Office on May 9, 2023, which corresponds to Japanese Patent Application No. 2020-119264 and is related to U.S. Appl. No. 17/365,917; with English language translation.

* cited by examiner

EXAMPLE 1

EXAMPLE 2

EXAMPLE 3

IMAGING LENS AND IMAGING APPARATUS

CROSS-REFERENCE TO RELATED APPLICATIONS

The present application claims priority under 35 U.S.C. § 119 to Japanese Patent Application No. 2020-119264, filed on Jul. 10, 2020. The above application is hereby expressly incorporated by reference, in its entirety, into the present application.

BACKGROUND OF THE INVENTION

1. Field of the Invention

The present disclosure relates to an imaging lens and an imaging apparatus.

2. Description of the Related Art

In the related art, as imaging lenses used in digital cameras and the like, the lens systems described in JP2019-101180A, JP2016-180851A, and JP2010-113248A are known.

SUMMARY OF THE INVENTION

In recent years, there has been a demand for an imaging lens having more favorable optical performance.

The present disclosure has been made in view of the above circumstances, and an object of the present disclosure is to provide an imaging lens, which has favorable optical performance, and an imaging apparatus comprising the imaging lens.

The imaging lens of the present disclosure comprises, successively in order from a position closest to an object side to an image side: a first lens group; and a second lens group that has a positive refractive power. During focusing, the first lens group remains stationary with respect to an image plane, and only the second lens group moves, a lens closest to the image side in the second lens group is a negative meniscus lens having a surface convex toward the object side, and assuming that a paraxial radius of curvature of an object side surface of the negative meniscus lens is rF, and a maximum image height is Y, Conditional Expression (1) is satisfied, which is represented by $$0.5 < rF/Y < 3 \quad (1).$$

It is preferable that a lens closest to the object side in the first lens group is a negative meniscus lens having a surface convex toward the object side.

Assuming that a paraxial radius of curvature of an image side surface of the negative meniscus lens of the second lens group is rR, it is preferable that the imaging lens of the present disclosure satisfies Conditional Expression (2), which is represented by $$0.06 < (rF-rR)/(rF+rR) < 0.27 \quad (2).$$

Assuming that a paraxial radius of curvature of an image side surface of a lens which is second from the image side in the second lens group is rRR, it is preferable that the imaging lens of the present disclosure satisfies Conditional Expression (3), which is represented by $$0.35 < (rRR+rF)/(rRR-rF) < 1 \quad (3).$$

Assuming that a distance on an optical axis from a lens surface closest to the object side in the second lens group to a lens surface closest to the image side in the second lens group is TL2, it is preferable that Conditional Expression (4) is satisfied, which is represented by $$1.2 < TL2/Y < 2 \quad (4).$$

It is preferable that the first lens group includes at least one negative lens, and a negative lens closest to the image side among negative lenses included in the first lens group is a negative meniscus lens having a surface convex toward the image side. In such a case, assuming that a paraxial radius of curvature of an object side surface of the negative lens closest to the image side among the negative lenses included in the first lens group is r1F, and a focal length of the imaging lens in a state where an object at infinity is in focus is f, it is preferable that the imaging lens of the present disclosure satisfies Conditional Expression (5), which is represented by $$-2.5 < r1F/f < -0.3 \quad (5).$$

It is preferable that the first lens group includes at least one negative lens. Assuming that an Abbe number of a negative lens closest to the image side among negative lenses included in the first lens group based on a d line is ν1, it is preferable that the imaging lens of the present disclosure satisfies Conditional Expression (6), which is represented by $$15 < \nu 1 < 38 \quad (6).$$

It is preferable that the second lens group includes at least one positive lens. Assuming that an Abbe number of a positive lens closest to the image side among positive lenses included in the second lens group based on a d line is ν2, it is preferable that the imaging lens of the present disclosure satisfies Conditional Expression (7), which is represented by $$10 < \nu 2 < 27 \quad (7).$$

Assuming that a focal length of the first lens group is f1, and a focal length of the second lens group is f2, it is preferable that the imaging lens of the present disclosure satisfies Conditional Expression (8), which is represented by $$0.05 < f2/f1 < 0.32 \quad (8).$$

It is preferable that a distance between lenses in each lens group remains stationary during focusing.

It is preferable that the imaging lens of the present disclosure further comprises a stop that remains stationary with respect to the image plane during focusing. Further, it is preferable that the imaging lens of the present disclosure comprises a stop that is closer to the image side than a lens surface closest to the image side in the first lens group.

It is preferable that the second lens group includes a plurality of positive lenses. It is preferable that the second lens group includes at least three positive lenses.

The imaging lens of the present disclosure may be configured to include at least one negative lens, and an object side surface of a lens, which is successively disposed on the image side of a negative lens closest to the object side among negative lenses included in the imaging lens, is a concave surface.

The imaging lens of the present disclosure may be configured to further comprise a third lens group that remains stationary with respect to the image plane during focusing.

It is preferable that a lens closest to the object side in the first lens group is a negative lens. Assuming that a focal length of the negative lens closest to the object side in the first lens group is fL1, and a focal length of a lens which is second from the object side of the first lens group is fL2, it is preferable that the imaging lens of the present disclosure satisfies Conditional Expression (9), which is represented by $$0.7 < fL1/fL2 < 2 \quad (9).$$

It is preferable that the first lens group includes at least one negative lens. Assuming that a maximum value of Abbe numbers of all negative lenses included in the first lens group based on a d line is vmax, and a minimum value of the Abbe numbers of all the negative lenses included in the first lens group based on the d line is vmin, it is preferable that the imaging lens of the present disclosure satisfies Conditional Expression (10), which is represented by $$20 < \nu\max - \nu\min < 100 \quad (10).$$

An imaging apparatus according to an aspect of the present disclosure comprises the imaging lens according to the aspect of the present disclosure.

In the present specification, it should be noted that the terms "consisting of ~" and "consists of ~" mean that the lens may include not only the above-mentioned components but also lenses substantially having no refractive powers, optical elements, which are not lenses, such as a stop, a filter, and a cover glass, and mechanism parts such as a lens flange, a lens barrel, an imaging element, and a camera shaking correction mechanism.

In the present specification, the term "~ group having a positive refractive power" means that the group has a positive refractive power as a whole. Similarly, the term "~ group having a negative refractive power" means that the group has a negative refractive power as a whole. The term "~ lens group" is not limited to a configuration consisting of a plurality of lenses, but may consist of only one lens.

It should be noted that the term "lens group" in the present specification refers to a part including the at least one lens, which is a constituent part of the imaging lens and is divided by an air distance that changes during focusing. During focusing, the lens groups move or remain stationary, and the mutual distance between the lenses in one lens group does not change.

The terms "a lens having a positive refractive power", "a positive lens", and "a lens with a positive power" are synonymous. The terms "a lens having a negative refractive power", "a negative lens", and "a lens with a negative power" are synonymous. The terms "a negative meniscus lens" and "a negative lens having a meniscus shape" are synonymous.

Unless otherwise specified, the sign of refractive power, the surface shape, and the radius of curvature of a lens including an aspheric surface are considered in terms of the paraxial region. Regarding the sign of the radius of curvature, the sign of the radius of curvature of the surface convex toward the object side is positive and the sign of the radius of curvature of the surface convex toward the image side is negative. A compound aspheric lens (a lens in which a spherical lens and an aspheric film formed on the spherical lens are integrally formed and function as one aspheric lens as a whole) is not regarded as cemented lenses, but the compound aspheric lens is regarded as one lens.

The "focal length" used in a conditional expression is a paraxial focal length. The values used in Conditional Expressions are values in a case where the d line is used as a reference in a state where the object at infinity is in focus. The "d line", "C line", and "F line" described in the present specification are emission lines. In the present specification, it is assumed that the d line wavelength is 587.56 nm (nanometers), the C line wavelength is 656.27 nm (nanometers), and the F line wavelength is 486.13 nm (nanometers).

According to the present disclosure, it is possible to provide an imaging lens having favorable optical performance, and an imaging apparatus comprising the imaging lens.

DESCRIPTION OF THE PREFERRED EMBODIMENTS

Hereinafter, embodiments of the present disclosure will be described with reference to the accompanying drawings.

Figure 1:
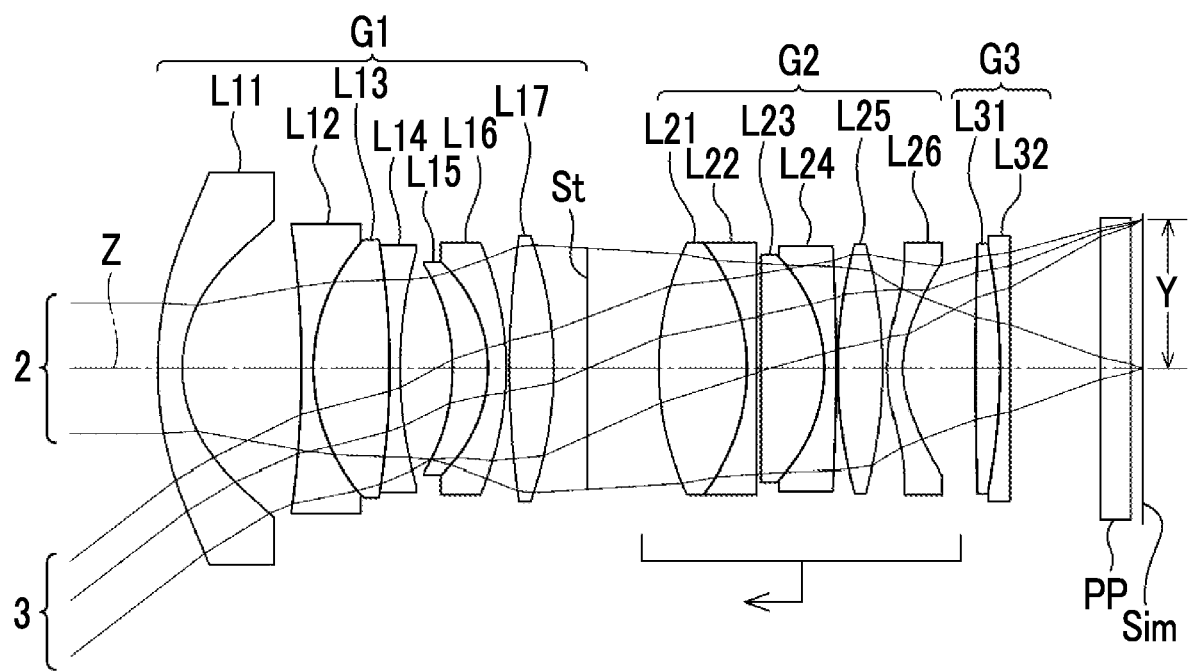
FIG. 1 is a cross-sectional view showing a configuration and rays of an imaging lens of Example 1.

FIG. 1 shows a cross-sectional view of the configuration and rays of the imaging lens according to the embodiment of the present disclosure in a state where the object at infinity is in focus. FIG. 1 shows, as the rays, on-axis rays 2 and rays at the maximum image height 3. In FIG. 1, the left side is the object side and the right side is the image side. The example shown in FIG. 1 corresponds to the imaging lens of Example 1 to be described later.

FIG. 1 shows an example in which, assuming that an imaging lens is applied to an imaging apparatus, an optical member PP having a parallel plate shape is disposed between the imaging lens and the image plane Sim. The optical member PP is a member assumed to include various filters, a cover glass, and/or the like. The various filters include, for example, a low pass filter, an infrared cut filter, and a filter that cuts a specific wavelength region. The optical member PP has no refractive power, and the optical member PP may be configured to be omitted.

The imaging lens of the present disclosure comprises, successively in order from a position closest to the object side to the image side along the optical axis Z: a first lens group G1; and a second lens group G2 that has a positive refractive power. By setting the second lens group G2 as a lens group having a positive refractive power, there is an advantage in performing focusing while suppressing fluctuations in aberrations in a lens system having a small F number.

For example, the imaging lens of FIG. 1 consists of, in order from the object side to the image side, a first lens group G1, a second lens group G2, and a third lens group G3. In the example in FIG. 1, the first lens group G1 consists of seven lenses L11 to L17 and an aperture stop St in order from the object side to the image side. The second lens group G2 consists of six lenses L21 to L26 in order from the object side to the image side. The third lens group G3 consists of two lenses L31 and L32 in order from the object side to the image side. The aperture stop St of FIG. 1 does not indicate the size and shape, but indicates the position in the optical axis direction.

In the imaging lens of the present disclosure, only the second lens group G2 moves during focusing. That is, in the example in FIG. 1, during focusing, only the second lens group G2 moves along the optical axis Z, and the first lens group G1 and the third lens group G3 remain stationary with respect to the image plane Sim. Hereinafter, the lens group that moves during focusing is referred to as a focus group. The arrow pointing to the left below the second lens group G2 shown in FIG. 1 indicates that the second lens group G2 is a focus group and moves to the object side during focusing from the object at infinity to the closest object. In the imaging lens of the present disclosure, the focus group consists of only the second lens group G2. As described above, by making the first lens group G1, which tends to be large in size, remain stationary during focusing, there is an advantage in achieving reduction in weight of the focus group.

In the imaging lens of the present disclosure, the lens closest to the image side in the second lens group G2 is configured to be a negative meniscus lens having a surface convex toward the object side. This configuration is advantageous in correcting field curvature while suppressing spherical aberration.

A preferable configuration and a possible configuration of the imaging lens of the present disclosure will be described below. In the following description, the imaging lens of the present disclosure is also referred to as an imaging lens.

Assuming that a paraxial radius of curvature of the object side surface of the negative meniscus lens closest to the image side in the second lens group G2 is rF and a maximum image height is Y, it is preferable that the imaging lens satisfies Conditional Expression (1). It is assumed that Y takes a positive value. By not allowing the corresponding value of Conditional Expression (1) to be equal to or less than the lower limit, the absolute value of the radius of curvature of this surface is prevented from being excessively small. Thus, there is an advantage in the workability of the lens, and there is an advantage in suppressing the field curvature from being excessively corrected. By not allowing the corresponding value of Conditional Expression (1) to be equal to or greater than the upper limit, there is an advantage in suppressing field curvature from being insufficiently corrected. In order to obtain more favorable characteristics, it is more preferable that the imaging lens satisfies Conditional Expression (1-1), and it is yet more preferable that the imaging lens satisfies Conditional Expression (1-2).

$$0.5 < rF/Y < 3 \tag{1}$$

$$0.65 < rF/Y < 2.2 \tag{1-1}$$

$$0.8 < rF/Y < 1.4 \tag{1-2}$$

Assuming that the paraxial radius of curvature of the object side surface of the negative meniscus lens closest to the image side in the second lens group G2 is rF and a paraxial radius of curvature of the image side surface thereof is rR, it is preferable that the imaging lens satisfies Conditional Expression (2). Conditional Expression (2) is an expression relating to the shape factor of the negative meniscus lens closest to the image side in the second lens group G2. By not allowing the corresponding value of Conditional Expression (2) to be equal to or less than the lower limit, there is an advantage in suppressing spherical aberration from being excessively corrected. By not allowing the corresponding value of Conditional Expression (2) to be equal to or greater than the upper limit, there is an advantage in suppressing spherical aberration from being insufficiently corrected. In order to obtain more favorable characteristics, it is more preferable that the imaging lens satisfies Conditional Expression (2-1), and it is yet more preferable that the imaging lens satisfies Conditional Expression (2-2).

$$0.06 < (rF - rR)/(rF + rR) < 0.27 \tag{2}$$

$$0.12 < (rF - rR)/(rF + rR) < 0.24 \tag{2-1}$$

$$0.17 < (rF - rR)/(rF + rR) < 0.21 \tag{2-2}$$

Assuming that the paraxial radius of curvature of the object side surface of the negative meniscus lens closest to the image side in the second lens group G2 is rF and a paraxial radius of curvature of the image side surface of the lens which is second from the image side in the second lens group G2 is rRR, it is preferable that the imaging lens satisfies Conditional Expression (3). Conditional Expression (3) is an expression relating to the shape factor of the air lens formed between a lens which is second from the image side in the second lens group G2 and the negative meniscus lens closest to the image side in the second lens group G2. By not allowing the corresponding value of Conditional Expression (3) to be equal to or less than the lower limit, it is possible to suppress excessive refraction of the off-axis rays having a high angle of view, and thus it is possible to suppress occurrence of coma aberration. By not allowing the corresponding value of Conditional Expression (3) to be equal to or greater than the upper limit, the refraction of the off-axis rays having a high angle of view is prevented from being excessively weak. Thus, there is an advantage in correcting field curvature. In order to obtain more favorable characteristics, it is more preferable that the imaging lens satisfies Conditional Expression (3-1), and it is yet more preferable that the imaging lens satisfies Conditional Expression (3-2).

$$0.35 < (rRR + rF)/(rRR - rF) < 1 \tag{3}$$

$$0.4 < (rRR + rF)/(rRR - rF) < 0.8 \tag{3-1}$$

$$0.45 < (rRR + rF)/(rRR - rF) < 0.6 \tag{3-2}$$

Assuming that a distance on the optical axis from the lens surface closest to the object side in the second lens group G2 to the lens surface closest to the image side in the second lens group G2 is TL2 and the maximum image height is Y, it is preferable that the imaging lens satisfies Conditional Expression (4). By not allowing the corresponding value of Conditional Expression (4) to be equal to or less than the lower limit, it is easy to guide the ray toward the image side without suddenly deflecting the ray. Therefore, there is an advantage in suppressing fluctuation in aberration during focusing. By not allowing the corresponding value of Conditional Expression (4) to be equal to or greater than the upper limit, there is an advantage in suppressing an increase in size of the focus group. In order to obtain more favorable characteristics, it is more preferable that the imaging lens satisfies Conditional Expression (4-1), and it is yet more preferable that the imaging lens satisfies Conditional Expression (4-2).

$$1.2 < TL2/Y < 2 \quad (4)$$

$$1.3 < TL2/Y < 1.8 \quad (4\text{-}1)$$

$$1.4 < TL2/Y < 1.6 \quad (4\text{-}2)$$

It is preferable that the lens closest to the object side in the first lens group G1 is a negative meniscus lens having a surface convex toward the object side. In such a case, there is an advantage in achieving a wide angle of view.

It is preferable that the first lens group G1 includes at least one negative lens, and a negative lens closest to the image side among negative lenses included in the first lens group G1 is a negative meniscus lens having a surface convex toward the image side. In such a case, the negative meniscus lens having a surface convex toward the image side can be disposed at a position where the separation between the on-axis rays and the off-axis rays is reduced. Thus, there is an advantage in correcting longitudinal chromatic aberration.

The first lens group G1 includes at least one negative lens, and the negative lens closest to the image side among the negative lenses included in the first lens group G1 is a negative meniscus lens having a surface convex toward the image side. In the configuration, it is preferable that the imaging lens satisfies Conditional Expression (5). In Conditional Expression (5), it is assumed that the paraxial radius of curvature of the object side surface of the negative lens closest to the image side among the negative lenses included in the first lens group G1 is r1F and a focal length of the imaging lens in a state where an object at infinity is in focus is f. By not allowing the corresponding value of Conditional Expression (5) to be equal to or less than the lower limit, the refractive power of the object side surface is prevented from being excessively weak. Thus, there is an advantage in correcting longitudinal chromatic aberration. By not allowing the corresponding value of Conditional Expression (5) to be equal to or greater than the upper limit, the refractive power of the object side surface is prevented from being excessively strong. Thus, there is an advantage in particularly suppressing chromatic aberration of rays passing through the periphery of the pupil among on-axis rays from being excessively corrected. In order to obtain more favorable characteristics, it is more preferable that the imaging lens satisfies Conditional Expression (5-1), and it is yet more preferable that the imaging lens satisfies Conditional Expression (5-2).

$$-2.5 < r1F/f < -0.3 \quad (5)$$

$$-1.8 < r1F/f < -0.5 \quad (5\text{-}1)$$

$$-1.1 < r1F/f < -0.7 \quad (5\text{-}2)$$

It is preferable that the first lens group G1 includes at least one negative lens. Assuming that an Abbe number of a negative lens closest to the image side among negative lenses included in the first lens group G1 based on the d line is ν1, it is preferable that the imaging lens satisfies Conditional Expression (6). By not allowing the corresponding value of Conditional Expression (6) to be equal to or less than the lower limit, there is an advantage in suppressing longitudinal chromatic aberration from being excessively corrected. By not allowing the corresponding value of Conditional Expression (6) to be equal to or greater than the upper limit, there is an advantage in suppressing longitudinal chromatic aberration from being insufficiently corrected. In order to obtain more favorable characteristics, it is more preferable that the imaging lens satisfies Conditional Expression (6-1), and it is yet more preferable that the imaging lens satisfies Conditional Expression (6-2).

$$15 < \nu 1 < 38 \quad (6)$$

$$18 < \nu 1 < 33 \quad (6\text{-}1)$$

$$23 < \nu 1 < 29 \quad (6\text{-}2)$$

It is preferable that the first lens group G1 includes at least one negative lens. Assuming that a maximum value of Abbe numbers of all negative lenses included in the first lens group G1 based on the d line is νmax, and a minimum value of the Abbe numbers of all the negative lenses included in the first lens group G1 based on the d line is νmin, it is preferable that the imaging lens satisfies Conditional Expression (10). By not allowing the corresponding value of Conditional Expression (10) to be equal to or less than the lower limit, there is an advantage in suppressing lateral chromatic aberration from being insufficiently corrected. By not allowing the corresponding value of Conditional Expression (10) to be equal to or greater than the upper limit, there is an advantage in suppressing lateral chromatic aberration from being excessively corrected. In order to obtain more favorable characteristics, it is more preferable that the imaging lens satisfies Conditional Expression (10-1), and it is yet more preferable that the imaging lens satisfies Conditional Expression (10-2).

$$20 < \nu\,\text{max} - \nu\,\text{min} < 100 \quad (10)$$

$$30 < \nu\,\text{max} - \nu\,\text{min} < 85 \quad (10\text{-}1)$$

$$40 < \nu\,\text{max} - \nu\,\text{min} < 75 \quad (10\text{-}2)$$

In a configuration in which the second lens group G2 includes at least one positive lens, assuming that an Abbe number of a positive lens closest to the image side among positive lenses included in the second lens group G2 based on the d line is ν2, it is preferable that the imaging lens satisfies Conditional Expression (7). By not allowing the corresponding value of Conditional Expression (7) to be equal to or less than the lower limit, there is an advantage in suppressing lateral chromatic aberration from being excessively corrected. By not allowing the corresponding value of Conditional Expression (7) to be equal to or greater than the upper limit, there is an advantage in suppressing lateral chromatic aberration from being insufficiently corrected. In order to obtain more favorable characteristics, it is more preferable that the imaging lens satisfies Conditional Expression (7-1), and it is yet more preferable that the imaging lens satisfies Conditional Expression (7-2).

$$10 < \nu 2 < 27 \quad (7)$$

$$13 < \nu 2 < 24 \quad (7\text{-}1)$$

$$16 < \nu 2 < 21 \quad (7\text{-}2)$$

It is preferable that the second lens group G2 includes a plurality of positive lenses. In such a case, there is an advantage in suppressing fluctuation in spherical aberration during focusing. In order to obtain this effect more remarkably, it is preferable that the second lens group G2 includes at least three positive lenses.

Assuming that a focal length of the first lens group G1 is f1 and a focal length of the second lens group G2 is f2, it is preferable that the imaging lens satisfies Conditional Expression (8). In a case where the imaging lens satisfies Conditional Expression (8), the first lens group G1 is a lens group having a positive refractive power. Since the first lens group G1 is a lens group having a positive refractive power, there is an advantage in achieving reduction in size of the focus group as compared with the case where the first lens group G1 is a lens group having a negative refractive power. By not allowing the corresponding value of Conditional Expression (8) to be equal to or less than the lower limit, the positive refractive power of the first lens group G1 is prevented from being excessively weak. Therefore, it is easy to reduce the diameter of the rays incident on the second lens group G2. Thus, there is an advantage in achieving reduction in size of the focus group. By not allowing the corresponding value of Conditional Expression (8) to be equal to or greater than the upper limit, the refractive power of the second lens group G2 is prevented from being excessively weak. Therefore, it is easy to suppress the moving amount of the focus group during focusing. Thus, there is an advantage in achieving reduction in size of the whole optical system. In order to obtain more favorable characteristics, it is more preferable that the imaging lens satisfies Conditional Expression (8-1), and it is yet more preferable that the imaging lens satisfies Conditional Expression (8-2).

$$0.05 < f2/f1 < 0.32 \quad (8)$$

$$0.1 < f2/f1 < 0.27 \quad (8\text{-}1)$$

$$0.15 < f2/f1 < 0.22 \quad (8\text{-}2)$$

The lens closest to the object side in the first lens group G1 is a negative lens. Assuming that a focal length of the negative lens closest to the object side in the first lens group G1 is fL1 and a focal length of the lens which is second from the object side in the first lens group G1 is fL2, it is preferable that the imaging lens satisfies Conditional Expression (9). By not allowing the corresponding value of Conditional Expression (9) to be equal to or less than the lower limit, the refractive power of a lens which is second from the object side of the first lens group G1 is prevented from being excessively weak. Therefore, there is an advantage in correcting coma aberration at a high angle of view. By not allowing the corresponding value of Conditional Expression (9) to be equal to or greater than the upper limit, the refractive power of the negative lens closest to the object side in the first lens group G1 is prevented from being excessively weak. Therefore, it is possible to suppress an increase in diameter of the lens while achieving an increase in angle of view. Thus, there is an advantage in achieving reduction in size. In order to obtain more favorable characteristics, it is more preferable that the imaging lens satisfies Conditional Expression (9-1), and it is yet more preferable that the imaging lens satisfies Conditional Expression (9-2).

$$0.7 < fL1/fL2 < 2 \quad (9)$$

$$0.9 < fL1/fL2 < 1.8 \quad (9\text{-}1)$$

$$1.1 < fL1/fL2 < 1.6 \quad (9\text{-}2)$$

In a case where the imaging lens may be configured to include at least one negative lens, an object side surface of a lens, which is successively disposed on the image side of a negative lens closest to the object side among negative lenses included in the imaging lens, is a concave surface. In such a case, there is an advantage in achieving reduction in diameter of the negative lens closest to the object side among the negative lenses included in the imaging lens. The imaging lens of FIG. 1 has this configuration. In the example in FIG. 1, the object side surface of the lens L12, which is successively disposed on the image side of the negative lens L11 closest to the object side, is a concave surface.

In a case where the imaging lens includes the aperture stop St, it is preferable that the aperture stop St remains stationary with respect to the image plane Sim during focusing. In such a case, there is an advantage in achieving reduction in weight of the focus group. Further, it is preferable that the aperture stop St is disposed closer to the image side than the lens surface closest to the image side in the first lens group G1. In such a case, the height of the off-axis rays which has a high angle of view and which is incident on the second lens group G2 from the optical axis Z can be lowered. Thus, there is an advantage in achieving reduction in weight of the focus group.

As shown in FIG. 1, the imaging lens may include a third lens group G3 remaining stationary with respect to the image plane Sim during focusing, at a position closer to the image side than the second lens group G2. In such a case, there is an advantage in correcting lateral chromatic aberration. The imaging lens may be configured to consist of a first lens group G1, a second lens group G2, and the third lens group G3. In such a case, there is an advantage in achieving both favorable aberration correction and reduction in size.

In a case where the imaging lens includes the third lens group G3, it is preferable that the third lens group G3 is a lens group having a negative refractive power. In such a case, the positive refractive power of the second lens group G2 can be increased. Thus, there is an advantage in suppressing the moving amount of the focus group during focusing.

It is preferable that a distance between lenses in each lens group remains stationary during focusing. In such a case, there is an advantage in simplifying the driving mechanism of the focus group.

Specifically, each lens group can adopt, for example, the following configuration.

The first lens group G1 may be configured to consist of four negative lenses and three positive lenses. Alternatively, the first lens group G1 may be configured to consist of five negative lenses and three positive lenses. The first lens group G1 may be configured to include two groups of cemented lenses. Thus, there is an advantage in correcting chromatic aberration. The lens closest to the image side in the first lens group G1 may be configured to be a positive lens. In such a case, there is an advantage in achieving reduction in diameter of the focus group.

The second lens group G2 may be configured to consist of three positive lenses and three negative lenses. The second lens group G2 may be configured to include at least one group of cemented lenses. Thus, there is an advantage in correcting chromatic aberration. In a case where the second lens group G2 includes a cemented lens, the cemented surface may have a shape in which a convex surface faces the image side. In such a case, there is an advantage in suppressing the amount of occurrence of aberration.

The third lens group G3 may be configured to consist of one positive lens and one negative lens. In such a case, there is an advantage in achieving both favorable performance and reduction in size. Further, in such a case, the positive lens and the negative lens of the third lens group G3 may be cemented. In a case where the lenses are cemented, it is more advantageous for reduction in size than in a case where the lenses are not cemented.

The above-mentioned preferred configurations and available configurations including the configurations relating to Conditional Expressions may be any combination, and it is preferable to appropriately selectively adopt the configurations in accordance with required specification. In addition, the preferred configurations relating to the conditional expressions are not limited to the conditional expressions described in the form of the expression, and the lower limit and the upper limit are selected from the preferable, more preferable, and yet more preferable conditional expressions. The conditional expressions may include all conditional expressions obtained through optional combinations.

For example, a preferred embodiment of the imaging lens of the present disclosure comprises, successively in order from a position closest to an object side to an image side: a first lens group G1; and a second lens group G2 that has a positive refractive power. During focusing, the first lens group G1 remains stationary with respect to the image plane Sim, and only the second lens group G2 moves, a lens closest to the image side in the second lens group G2 is a negative meniscus lens having a surface convex toward the object side, the imaging lens satisfies Conditional Expression (1). According to this preferred aspect of the imaging lens, there is an advantage in performing focusing while suppressing fluctuations in aberrations in a lens system having a small F number while maintaining favorable performance and achieving reduction in weight of the focus group.

Next, examples of the imaging lens of the present disclosure will be described with reference to the drawings.

Example 1

FIG. 1 is a cross-sectional view showing a configuration and rays of an imaging lens of Example 1, and an illustration method and a configuration thereof are as described above. Therefore, description is partially not repeated herein. The imaging lens of Example 1 consists of, in order from the object side to the image side, a first lens group G1 having a positive refractive power, a second lens group G2 having a positive refractive power, and a third lens group G3 having a negative refractive power. During focusing from the object at infinity to the closest object, only the second lens group G2 moves to the object side along the optical axis Z, and the first lens group G1 and the third lens group G3 remain stationary with respect to the image plane Sim.

The first lens group G1 consists of, in order from the object side to the image side: a negative lens L11 having a meniscus shape and having a surface convex toward the object side; a negative lens L12 having a biconcave shape; a positive lens L13 having a biconvex shape; a negative lens L14 having a biconcave shape; a positive lens L15 having a meniscus shape and having a surface convex toward the image side; a negative lens L16 having a meniscus shape and having a surface convex toward the image side; a positive lens L17 having a biconvex shape; and an aperture stop St.

The lens L12, the lens L13, and the lens L14 are cemented. The lens L15 and the lens L16 are cemented.

The second lens group G2 consists of, in order from the object side to the image side: a positive lens L21 having a biconvex shape; a negative lens L22 having a surface concave toward the object side; a positive lens L23 having a surface convex toward the image side; a negative lens L24 having a surface concave toward the object side; a positive lens L25 having a biconvex shape; and a negative lens L26 having a meniscus shape and having a surface convex toward the object side. The lens L21 and the lens L22 are cemented. The lens L23 and the lens L24 are cemented.

The third lens group G3 consists of, in order from the object side to the image side, a positive lens L31 having a biconvex shape and a negative lens L32 having a surface concave toward the object side. The lens L31 and the lens L32 are cemented.

Regarding the imaging lens of Example 1, Table 1 shows basic lens data, Table 2 shows specification and variable surface distance, and Table 3 shows aspheric surface coefficients thereof. In Table 1, the column of S shows surface numbers. The surface closest to the object side is the first surface, and the surface numbers increase one by one toward the image side. The column of r shows radii of curvature of the respective surfaces. The column of d shows surface distances on the optical axis between the respective surfaces and the surfaces adjacent to the image side. The column of nd shows a refractive index of each component at the d line, and the column of vd shows an Abbe number of each component based on the d line.

In Table 1, the sign of the radius of curvature of the surface convex toward the object side is positive and the sign of the radius of curvature of the surface convex toward the image side is negative. Table 1 also shows the aperture stop St and the optical member PP. In a place of a surface number of a surface corresponding to the aperture stop St, the surface number and a term of (St) are noted. A value at the bottom place of d in Table 1 indicates a distance between the image plane Sim and the surface closest to the image side in the table. In Table 1, the symbol DD [ ] is used for each variable surface distance during zooming, and the object side surface number of the distance is given in [ ] and is noted in the column d.

Table 2 shows values of the focal length f, the open F number FNo., the maximum total angle of view 2ω max, and the variable surface distance during focusing. (°) in the place of 2ω max indicates that the unit thereof is a degree. Table 2 shows cases where the object distances are infinity and 110 mm (millimeter), respectively. That is, the column labeled "Infinity" shows values in a state where the object at infinity is in focus, and the column labeled "110 mm" shows values in a state where the object at the object distance of 110 mm (millimeters) is in focus. The object distance is a distance on the optical axis from the object to the lens surface closest to the object side in the first lens group G1. The values shown in Table 2 are based on the d line.

In Table 1, the reference sign * is attached to surface numbers of aspheric surfaces, and numerical values of the paraxial radius of curvature are written into the column of the radius of curvature of the aspheric surface. In Table 3, the row of S shows surface numbers of the aspheric surfaces, and the rows of KA and Am (m=3, 4, 5, . . . , 16) shows numerical values of the aspheric surface coefficients for each aspheric surface. The "E±n" (n: an integer) in numerical values of the aspheric surface coefficients of Table 3 indicates "×10$^{\pm n}$". KA and Am are the aspheric surface coefficients in the aspheric surface expression represented by the following expression.

$$Zd=C\times h^2/\{1+(1-KA\times C^2\times h^2)^{1/2}\}+\Sigma m\times h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is an inverse of a paraxial radius of curvature, and KA and Am are aspheric surface coefficients, and $\Sigma$ in the aspheric surface expression means the sum with respect to m.

In data of each table, a degree is used as a unit of an angle, and mm (millimeter) is used as a unit of a length, but appropriate different units may be used since the optical system can be used even in a case where the system is enlarged or reduced in proportion. Each of the following tables shows numerical values rounded off to predetermined decimal places.

TABLE 1

Example 1

| S | r | d | nd | vd |
|---|---|---|---|---|
| *1 | 42.5066 | 2.2600 | 1.58313 | 59.46 |
| *2 | 14.3565 | 11.0287 | | |
| 3 | −100.1648 | 1.0200 | 1.58313 | 59.46 |
| 4 | 18.6299 | 7.0500 | 1.89190 | 37.13 |
| 5 | −75.4980 | 0.9700 | 1.48749 | 70.42 |
| 6 | 42.5062 | 4.8671 | | |
| *7 | −20.6733 | 3.2800 | 1.58313 | 59.46 |
| 8 | −13.9817 | 1.6600 | 2.00069 | 25.43 |
| 9 | −31.4975 | 0.3000 | | |
| 10 | 89.0372 | 4.1100 | 1.95375 | 32.32 |
| 11 | −38.4770 | 3.1390 | | |
| 12(St) | ∞ | DD[12] | | |
| 13 | 28.6629 | 8.1800 | 1.59282 | 68.62 |
| 14 | −19.7999 | 0.9100 | 1.85451 | 25.15 |
| 15 | ∞ | 0.4007 | | |
| 16 | ∞ | 5.8500 | 1.77250 | 49.61 |
| 17 | −15.4540 | 1.0900 | 1.85451 | 25.15 |
| 18 | −209.9846 | 0.1389 | | |
| 19 | 45.3596 | 4.1600 | 2.00272 | 19.32 |
| 20 | −45.3596 | 0.4000 | | |
| *21 | 16.1711 | 1.3856 | 1.80610 | 40.73 |
| *22 | 11.0173 | DD[22] | | |
| 23 | 363.2443 | 2.2800 | 1.60300 | 65.46 |
| 24 | −62.1067 | 0.9200 | 1.84667 | 23.79 |
| 25 | ∞ | 8.4141 | | |
| 26 | ∞ | 2.8500 | 1.51680 | 64.20 |
| 27 | ∞ | 1.1000 | | |

TABLE 2

Example 1

| Object Distance | Infinity | 110 mm |
|---|---|---|
| f | 17.90 | 17.65 |
| FNo. | 1.44 | 1.54 |
| 2ωmax(°) | 78.6 | 76.0 |
| Y | 14.2 | 14.2 |
| DD[12] | 6.58 | 4.08 |
| DD[22] | 6.72 | 9.22 |

TABLE 3

Example 1

| S | 1 | 2 | 7 |
|---|---|---|---|
| KA | 3.8510739E+00 | −4.3296751E+00 | −3.0025899E+00 |
| A3 | 0.0000000E+00 | 0.0000000E+00 | 0.0000000E+00 |
| A4 | 8.2101298E−05 | 3.1069943E−04 | −5.9789840E−05 |
| A5 | −9.5739997E−06 | −1.0193003E−05 | 4.0272162E−07 |
| A6 | 5.9588626E−07 | −9.9029127E−07 | −1.2393722E−06 |
| A7 | −3.0455959E−08 | 7.4165898E−09 | 3.9428093E−07 |
| A8 | −1.9480492E−09 | 5.8171636E−09 | −3.5102283E−08 |
| A9 | 4.0864450E−10 | 1.7037688E−10 | −2.4364513E−09 |
| A10 | −1.4919699E−11 | −1.6321215E−11 | 3.7344047E−10 |
| A11 | −1.8257720E−13 | −1.4903567E−12 | 3.9820245E−11 |
| A12 | −2.7147724E−14 | −2.8746210E−13 | −6.3260902E−12 |
| A13 | 3.4618551E−15 | 5.1753338E−14 | −2.0073400E−13 |
| A14 | −2.7227826E−18 | −2.5285882E−15 | 7.3073525E−14 |
| A15 | −6.6705344E−18 | 4.0808858E−17 | −4.4848603E−15 |
| A16 | 1.4994304E−19 | −8.7993111E−21 | 9.4036412E−17 |

| S | 21 | 22 |
|---|---|---|
| KA | −5.0000027E+00 | −1.4211109E+00 |
| A3 | 0.0000000E+00 | 0.0000000E+00 |
| A4 | −1.5689881E−05 | 3.0065970E−05 |
| A5 | −6.5802732E−06 | −1.9431301E−05 |
| A6 | −6.9255100E−07 | 3.3138973E−06 |
| A7 | 1.4479909E−08 | −4.3716353E−07 |
| A8 | 1.4122715E−08 | 2.8105186E−08 |
| A9 | −3.4964926E−10 | 1.7441042E−09 |
| A10 | −7.5590845E−11 | −1.5417488E−10 |
| A11 | 6.1173246E−12 | −2.3068826E−11 |
| A12 | −9.6603698E−13 | 1.2815061E−12 |
| A13 | 7.7251258E−14 | 2.3110962E−13 |
| A14 | 1.1107596E−15 | −2.7371328E−14 |
| A15 | −3.0214962E−16 | 1.2010839E−15 |
| A16 | 7.8465436E−18 | −2.1499728E−17 |

Figure 2:
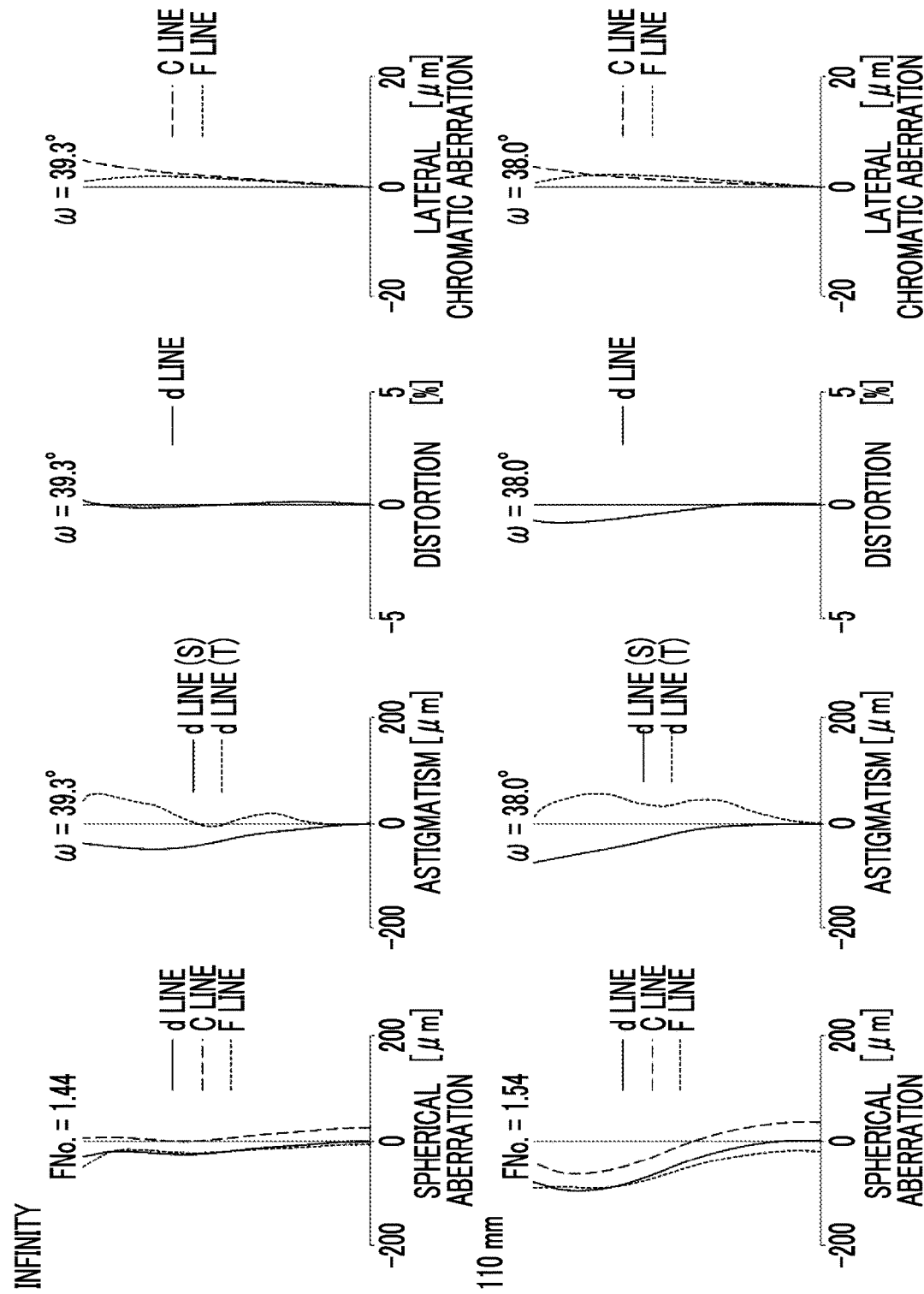
FIG. 2 shows spherical aberration diagrams, astigmatism diagrams, distortion diagrams, lateral chromatic aberration diagrams of the imaging lens of Example 1.
Figure 3:
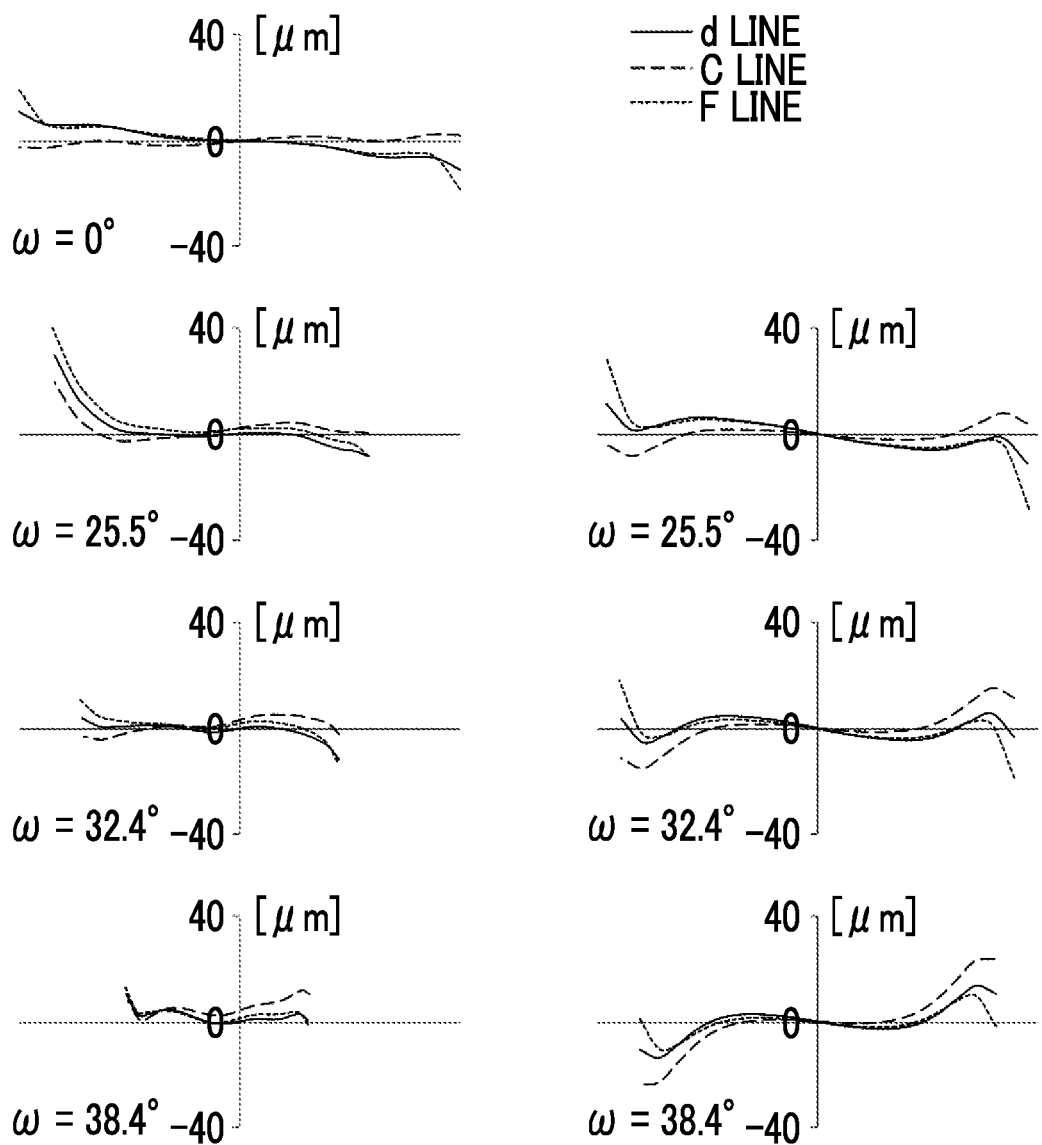
FIG. 3 shows lateral aberration diagrams of the imaging lens of Example 1 in a state where the object at infinity is in focus.
Figure 4:
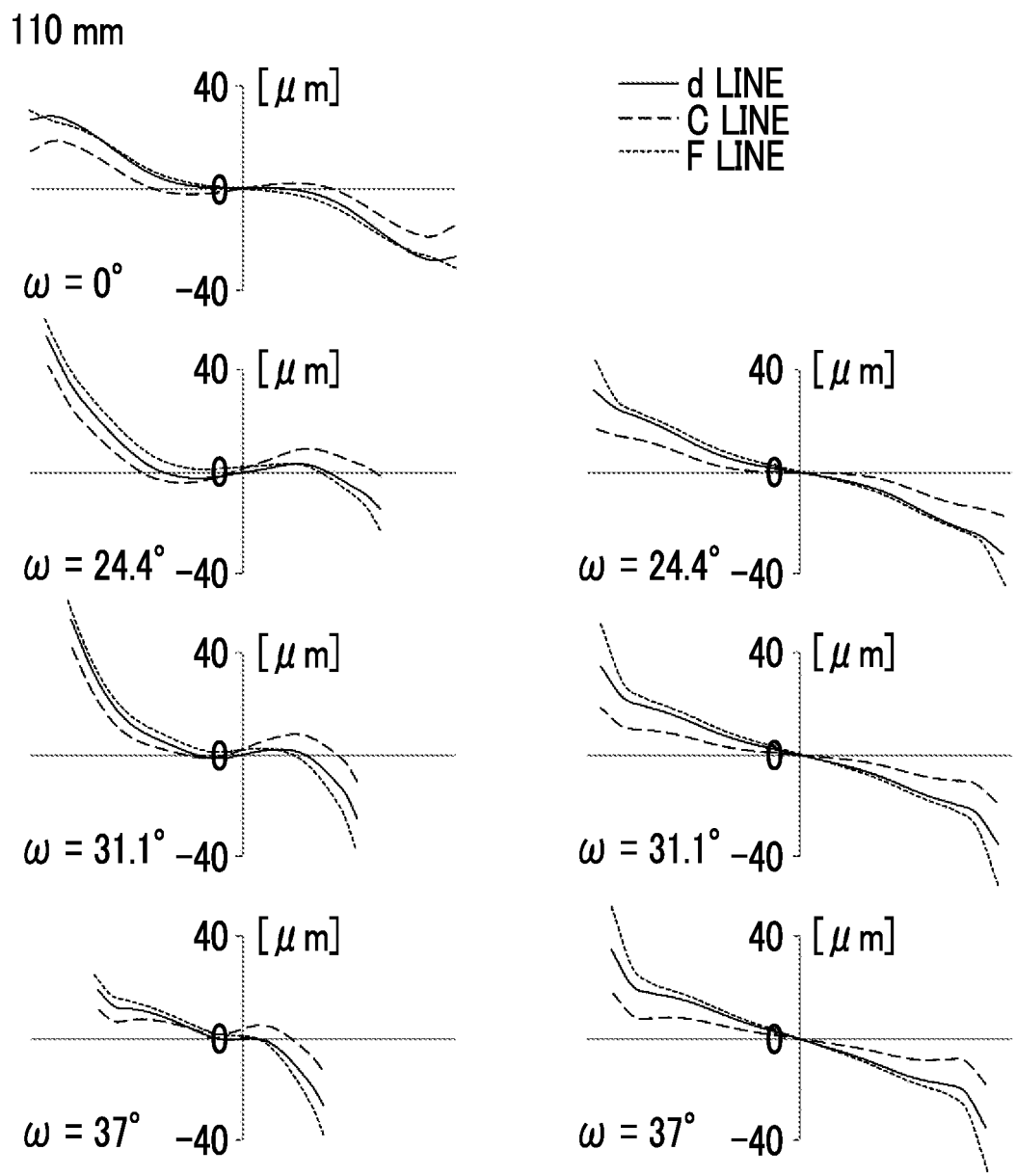
FIG. 4 shows lateral aberration diagrams of the imaging lens of Example 1 in a state where the close range object is in focus.

FIGS. 2, 3, and 4 each show aberration diagrams of the imaging lens of Example 1. In FIG. 2, in order from the left side, spherical aberration, astigmatism, distortion, and lateral chromatic aberration are shown. FIG. 2 shows aberration diagrams in a state where the object at infinity is in focus in the upper part labeled "infinity", and shows aberration diagrams in a state where the object at the object distance of 110 mm (millimeter) is in focus in the lower part labeled "110 mm". In spherical aberration diagram, aberrations at the d line, the C line, and the F line are indicated by the solid line, the long dashed line, and the short dashed line, respectively. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In lateral chromatic aberration diagram, aberrations at the C line, and the F line are respectively indicated by the long dashed line, and the short dashed line. In spherical aberration diagram, FNo. indicates an F number. In the other aberration diagrams, ω indicates a half angle of view. FIG. 2 shows values of FNo. and ω corresponding to the upper part in the vertical axis of each diagram.

FIG. 3 shows lateral aberrations in a state where the object at infinity is in focus. In FIG. 3, the left column shows lateral aberrations in the tangential direction, and the right column shows lateral aberrations in the sagittal direction. In FIG. 3, aberrations at the d line, the C line, and the F line are indicated by the solid line, the long dashed line, and the short dashed line, respectively. In FIG. 3, ω means a half angle of view. Similar to FIG. 3, FIG. 4 shows lateral aberrations in a state where the object at the object distance of 110 mm (millimeters) is in focus.

Symbols, meanings, description methods, and illustration methods of the respective data pieces according to Example 1 are the same as those in the following examples unless otherwise specified. Therefore, in the following description, repeated description will not be given.

Example 2

Figure 5:
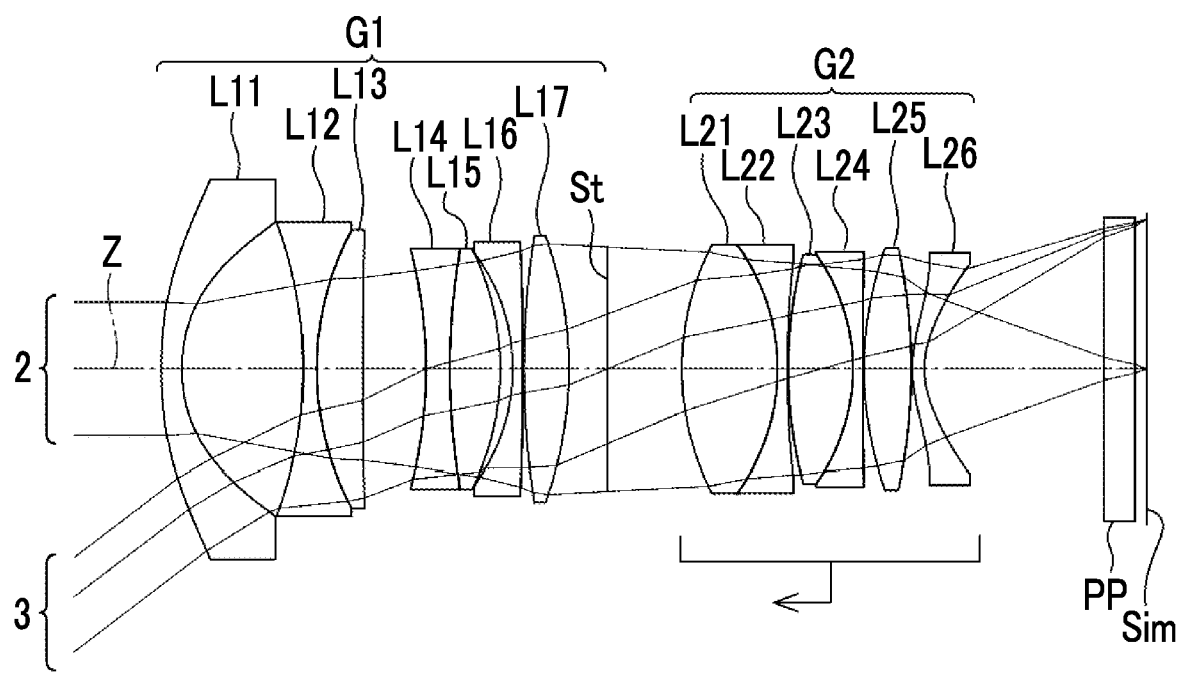
FIG. 5 is a cross-sectional view showing a configuration and rays of an imaging lens of Example 2.

FIG. 5 is a cross-sectional view showing a configuration and rays of the imaging lens of Example 2. The imaging lens of Example 2 consists of, in order from the object side to the image side, a first lens group G1 that has a positive refractive power, and a second lens group G2 that has a positive refractive power. During focusing from the object at infinity to the closest object, only the second lens group G2 moves to the object side along the optical axis Z, and the first lens group G1 remains stationary with respect to the image plane Sim.

The first lens group G1 consists of, in order from the object side to the image side: a negative lens L11 having a meniscus shape and having a surface convex toward the object side; a negative lens L12 having a biconcave shape; a positive lens L13 having a meniscus shape and a surface convex toward the object side; a negative lens L14 having a biconcave shape; a positive lens L15 having a biconvex shape; a negative lens L16 having a meniscus shape and having a surface convex toward the image side; a positive lens L17 having a biconvex shape; and an aperture stop St. The lens L12 and the lens L13 are cemented. The lens L14 and the lens L15 are cemented.

The second lens group G2 consists of, in order from the object side to the image side: a positive lens L21 having a biconvex shape; a negative lens L22 having a biconcave shape; a positive lens L23 having a biconvex shape; a negative lens L24 having a biconcave shape; a positive lens L25 having a biconvex shape; and a negative lens L26 having a meniscus shape and having a surface convex toward the object side. The lens L21 and the lens L22 are cemented. The lens L23 and the lens L24 are cemented.

Figure 6:
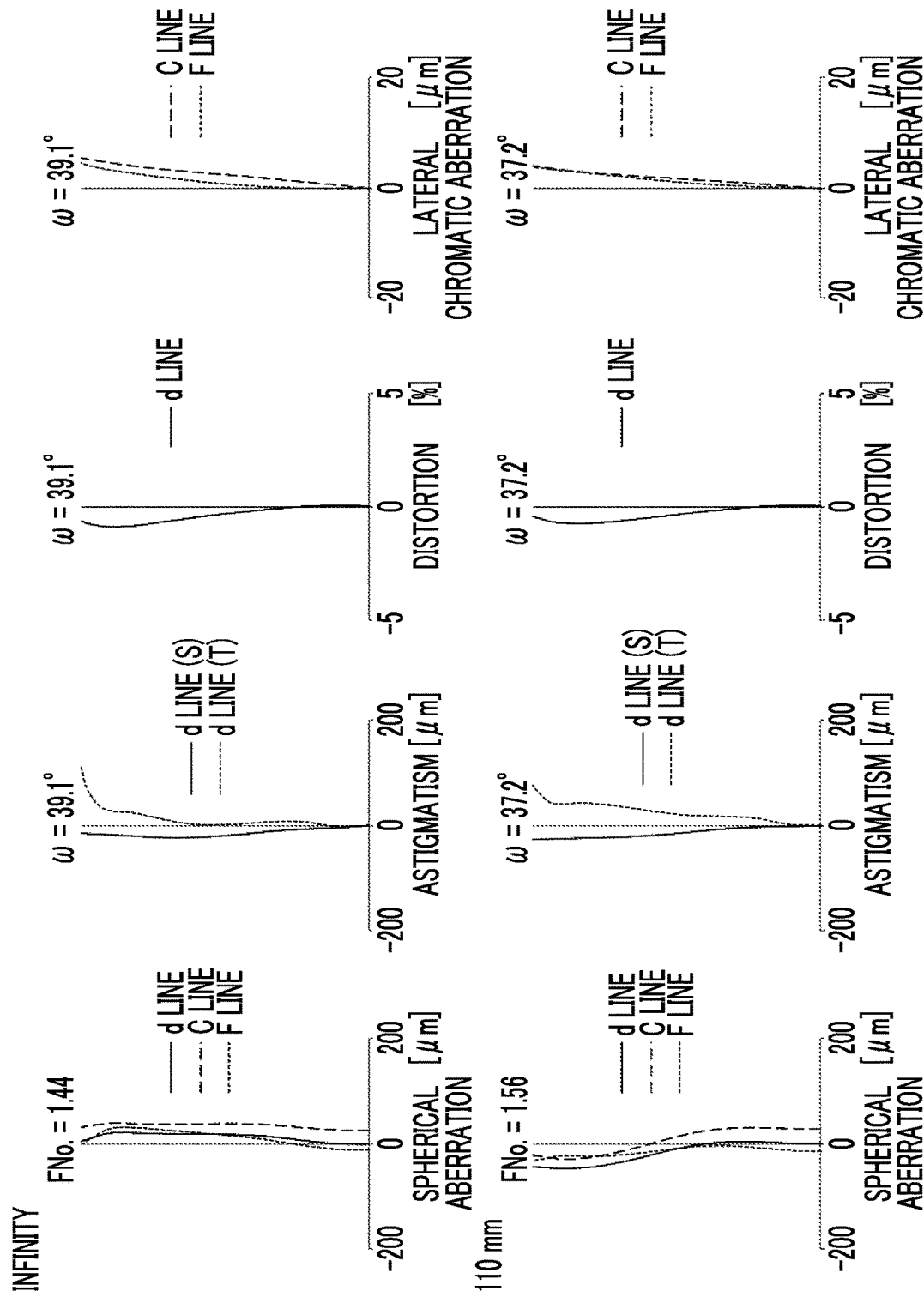
FIG. 6 shows spherical aberration diagrams, astigmatism diagrams, distortion diagrams, lateral chromatic aberration diagrams of the imaging lens of Example 2.
Figure 7:
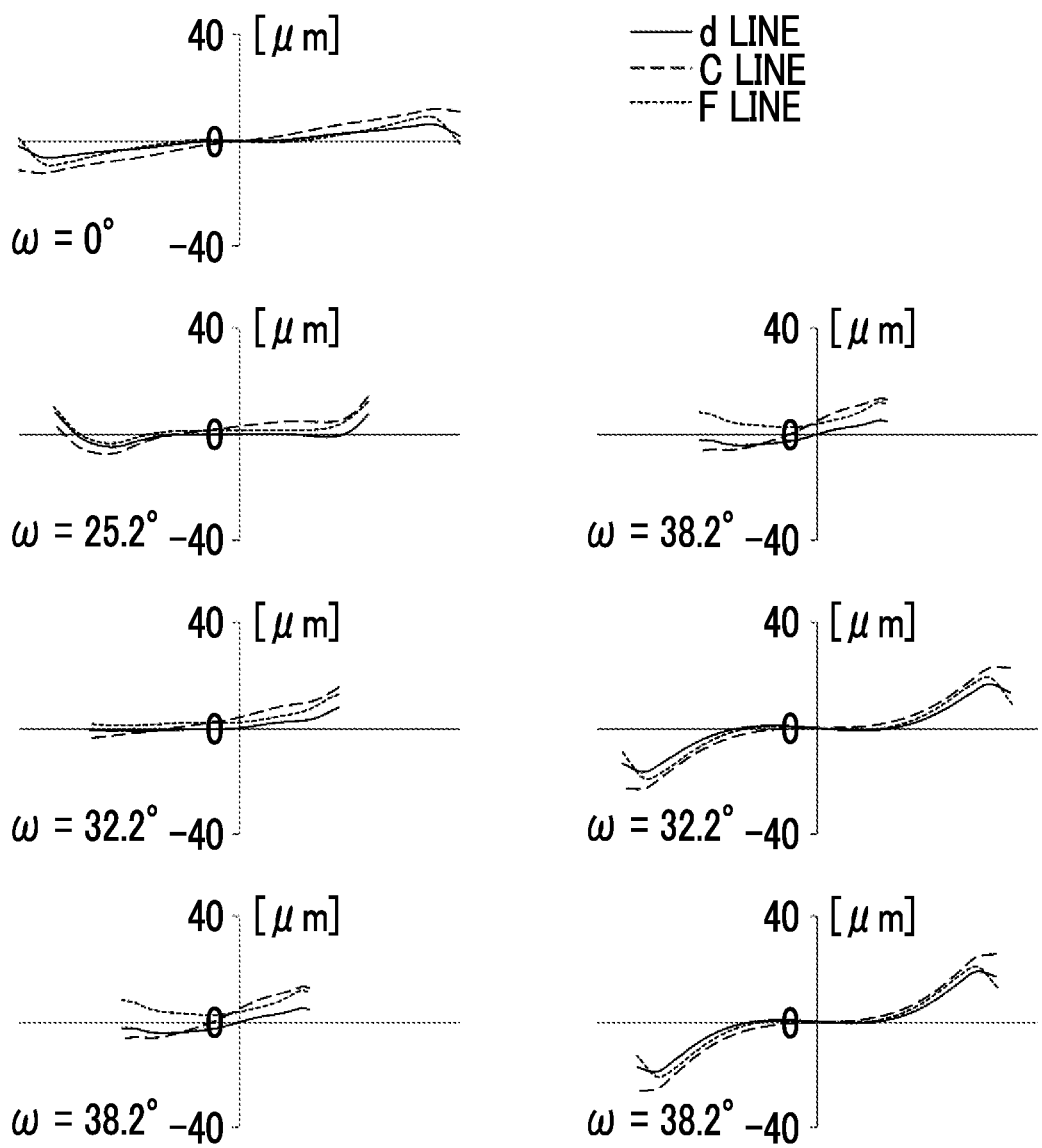
FIG. 7 shows lateral aberration diagrams of the imaging lens of Example 2 in a state where the object at infinity is in focus.
Figure 8:
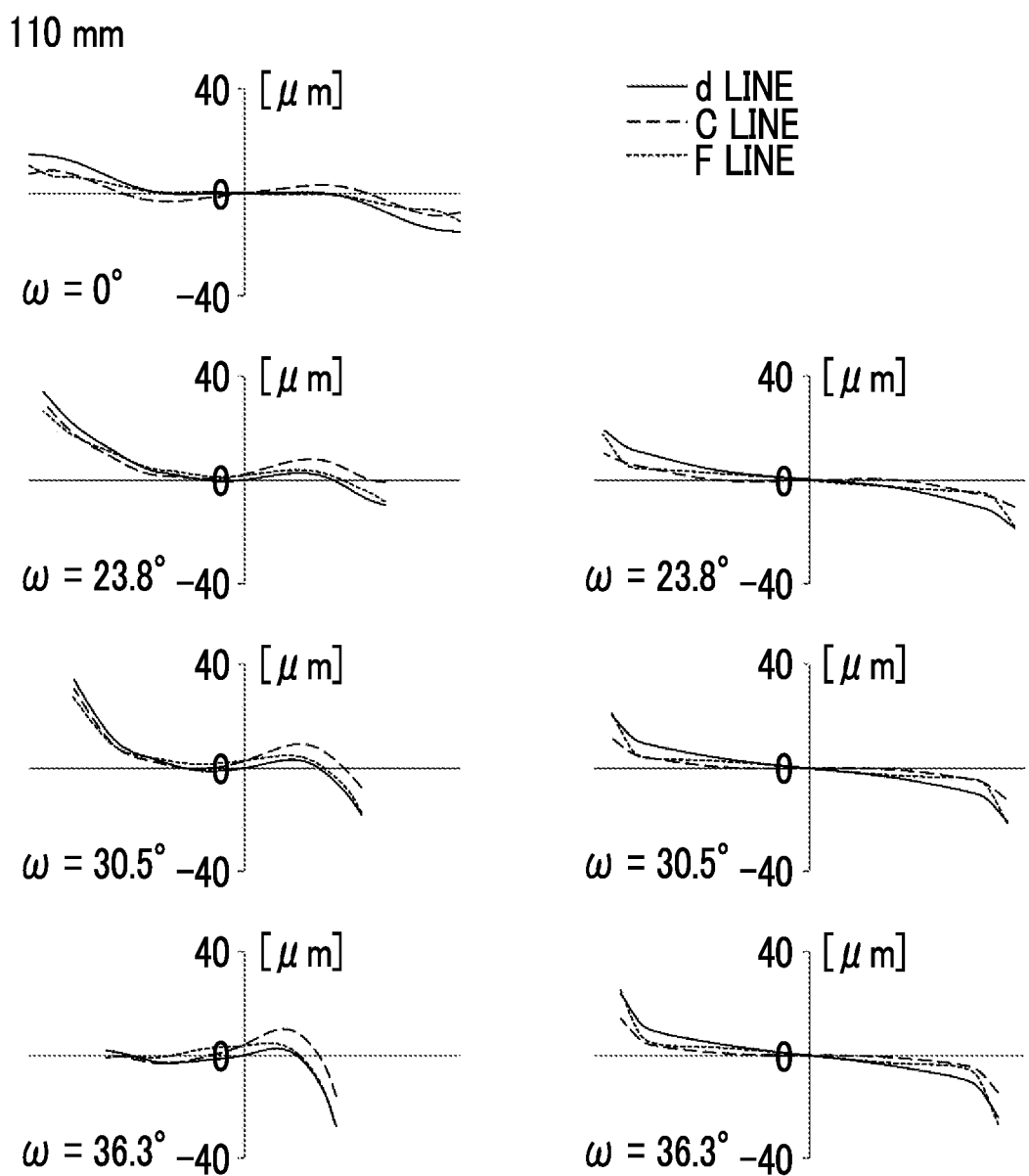
FIG. 8 shows lateral aberration diagrams of the imaging lens of Example 2 in a state where the close range object is in focus.

Regarding the imaging lens of Example 2, Table 4 shows basic lens data, Table 5 shows specification and variable surface distances, and Table 6 shows aspheric surface coefficients thereof, and FIGS. 6 to 8 each show aberration diagrams. In FIG. 6, the upper row shows spherical aberration, astigmatism, distortion, and lateral chromatic aberration, in a state where the object at infinity is in focus, and the lower row shows spherical aberration, astigmatism, distortion, and lateral chromatic aberration, in the state where the object at the object distance of 110 mm (millimeter) is in focus. FIG. 7 shows lateral aberrations in a state where the object at infinity is in focus. FIG. 8 shows lateral aberrations in a state where the object at the object distance of 110 mm (millimeters) is in focus.

TABLE 4

| | | Example 2 | | |
|---|---|---|---|---|
| S | r | d | nd | νd |
| *1 | 50.9202 | 1.8721 | 1.58313 | 59.38 |
| *2 | 15.5929 | 11.1254 | | |
| 3 | −41.2861 | 1.1918 | 1.48749 | 70.44 |
| 4 | 28.6638 | 4.2247 | 2.00069 | 25.46 |
| 5 | 547.2491 | 5.8234 | | |
| 6 | −45.3239 | 2.1805 | 1.68893 | 31.07 |
| 7 | 68.3842 | 4.6317 | 1.69680 | 55.53 |
| 8 | −26.2063 | 1.1493 | | |
| 9 | −18.8555 | 0.9231 | 1.74077 | 27.79 |
| 10 | −317.6806 | 0.1000 | | |
| 11 | 83.7496 | 4.1391 | 1.95375 | 32.32 |
| 12 | −37.6767 | 3.5285 | | |
| 13(St) | ∞ | DD[13] | | |
| 14 | 26.4192 | 8.7875 | 1.55032 | 75.50 |
| 15 | −20.4793 | 0.8968 | 1.78880 | 28.43 |
| 16 | 94.9622 | 0.1000 | | |
| 17 | 43.8350 | 5.9348 | 1.75500 | 52.32 |
| 18 | −19.0896 | 0.9112 | 1.85478 | 24.80 |
| 19 | 873.6132 | 0.1000 | | |
| 20 | 34.7161 | 4.2520 | 1.92286 | 18.90 |
| 21 | −55.7621 | 0.1000 | | |
| *22 | 12.8449 | 1.1053 | 1.80625 | 40.91 |
| *23 | 8.6197 | DD[23] | | |
| 24 | ∞ | 2.8500 | 1.51680 | 64.20 |
| 25 | ∞ | 1.1000 | | |

TABLE 5

| | Example 2 | |
|---|---|---|
| Object Distance | Infinity | 110 mm |
| f | 18.20 | 18.07 |
| FNo. | 1.44 | 1.56 |
| 2ωmax(°) | 78.2 | 74.4 |
| Y | 14.2 | 14.2 |
| DD[13] | 6.84 | 4.11 |
| DD[23] | 16.51 | 19.25 |

TABLE 6

| | | Example 2 | | |
|---|---|---|---|---|
| S | 1 | 2 | 22 | 23 |
| KA | −3.5524107E+00 | −4.3839153E−01 | −8.7749470E−01 | −1.7564944E+00 |
| A3 | 0.0000000E+00 | 0.0000000E+00 | 0.0000000E+00 | 0.0000000E+00 |
| A4 | 1.4562563E−04 | 1.9987653E−04 | −2.9457203E−04 | 4.5987345E−05 |
| A5 | −1.5586134E−05 | −1.4237156E−05 | −3.0213717E−05 | −4.2734089E−05 |
| A6 | 5.2002049E−07 | 3.8653493E−08 | 8.8294930E−06 | 8.3923312E−06 |
| A7 | 4.4576460E−08 | 9.7639392E−08 | −6.3236083E−07 | −6.7249893E−07 |
| A8 | −7.2822532E−09 | 1.3127811E−10 | 6.6065017E−08 | 3.8700650E−08 |
| A9 | 2.3897513E−10 | −1.7402613E−09 | −1.8681912E−08 | −1.0369127E−09 |
| A10 | 2.0729060E−11 | 1.0104915E−10 | 2.8496418E−09 | −7.1101541E−10 |
| A11 | −4.2346876E−13 | 1.0980116E−11 | −2.1192026E−10 | 1.4318222E−10 |
| A12 | −2.6304469E−13 | −1.4408297E−12 | 5.7452181E−12 | −4.3454846E−12 |
| A13 | 2.7068251E−14 | 5.0098114E−14 | 1.3592773E−13 | −1.7638060E−12 |

TABLE 6-continued

| | Example 2 | | | |
|---|---|---|---|---|
| S | 1 | 2 | 22 | 23 |
| A14 | −1.2272789E−15 | 2.0411475E−16 | −3.2656663E−15 | 2.5353158E−13 |
| A15 | 2.8191990E−17 | −5.1685374E−17 | −6.9338244E−16 | −1.4072532E−14 |
| A16 | −2.6907030E−19 | 9.6690889E−19 | 2.5709964E−17 | 2.9452493E−16 |

Example 3

Figure 9:
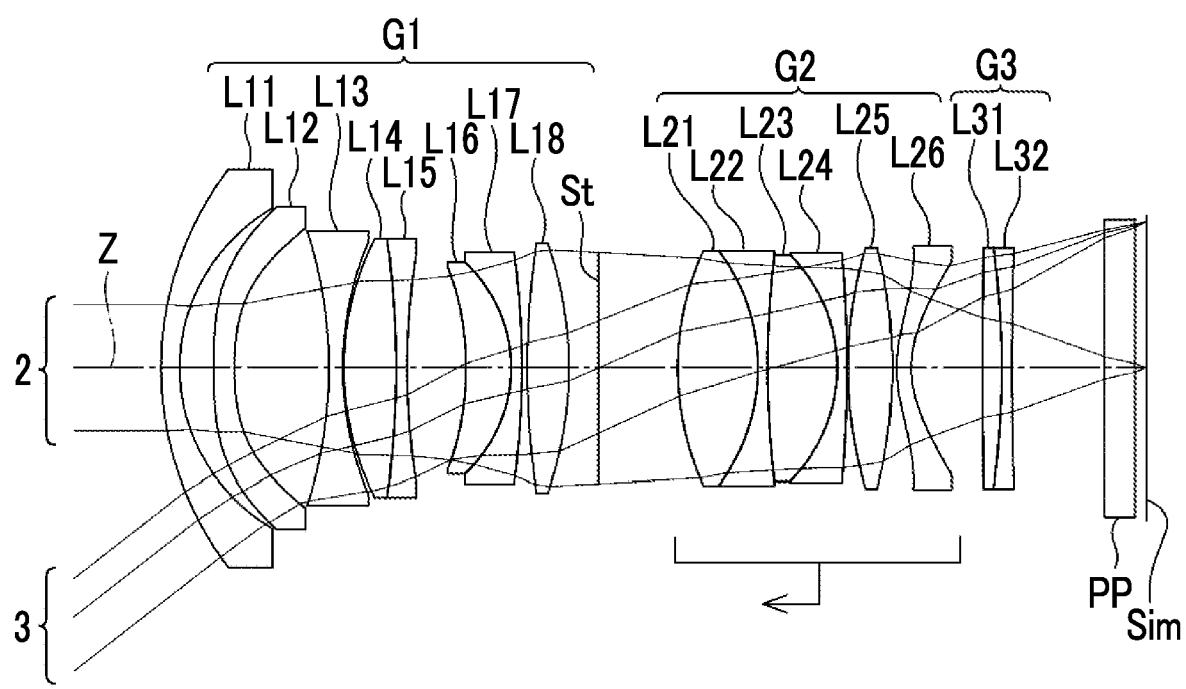
FIG. 9 is a cross-sectional view showing a configuration and rays of an imaging lens of Example 3.

FIG. 9 is a cross-sectional view showing a configuration and rays of the imaging lens of Example 3. The imaging lens of Example 3 consists of, in order from the object side to the image side, a first lens group G1 having a positive refractive power, a second lens group G2 having a positive refractive power, and a third lens group G3 having a negative refractive power. During focusing from the object at infinity to the closest object, only the second lens group G2 moves to the object side along the optical axis Z, and the first lens group G1 and the third lens group G3 remain stationary with respect to the image plane Sim.

The first lens group G1 consists of, in order from the object side to the image side: a negative lens L11 having a meniscus shape and having a surface convex toward the object side; a negative lens L12 having a meniscus shape and a surface convex toward the object side; a negative lens L13 having a biconcave shape; a positive lens L14 having a biconvex shape; a negative lens L15 having a biconcave shape; a positive lens L16 having a meniscus shape and having a surface convex toward the image side; a negative lens L17 having a meniscus shape and having a surface convex toward the image side; a positive lens L18 having a biconvex shape; and an aperture stop St. The lens L14 and the lens L15 are cemented. The lens L16 and the lens L17 are cemented.

The second lens group G2 consists of, in order from the object side to the image side: a positive lens L21 having a biconvex shape; a negative lens L22 having a biconcave shape; a positive lens L23 having a biconvex shape; a negative lens L24 having a meniscus shape and having a surface concave toward the object side; a positive lens L25 having a biconvex shape; and a negative lens L26 having a meniscus shape and having a surface convex toward the object side. The lens L21, the lens L22, the lens L23, and the lens L24 are cemented.

The third lens group G3 consists of, in order from the object side to the image side, a positive lens L31 having a biconvex shape and a negative lens L32 having a biconcave shape. The lens L31 and the lens L32 are cemented.

Figure 10:
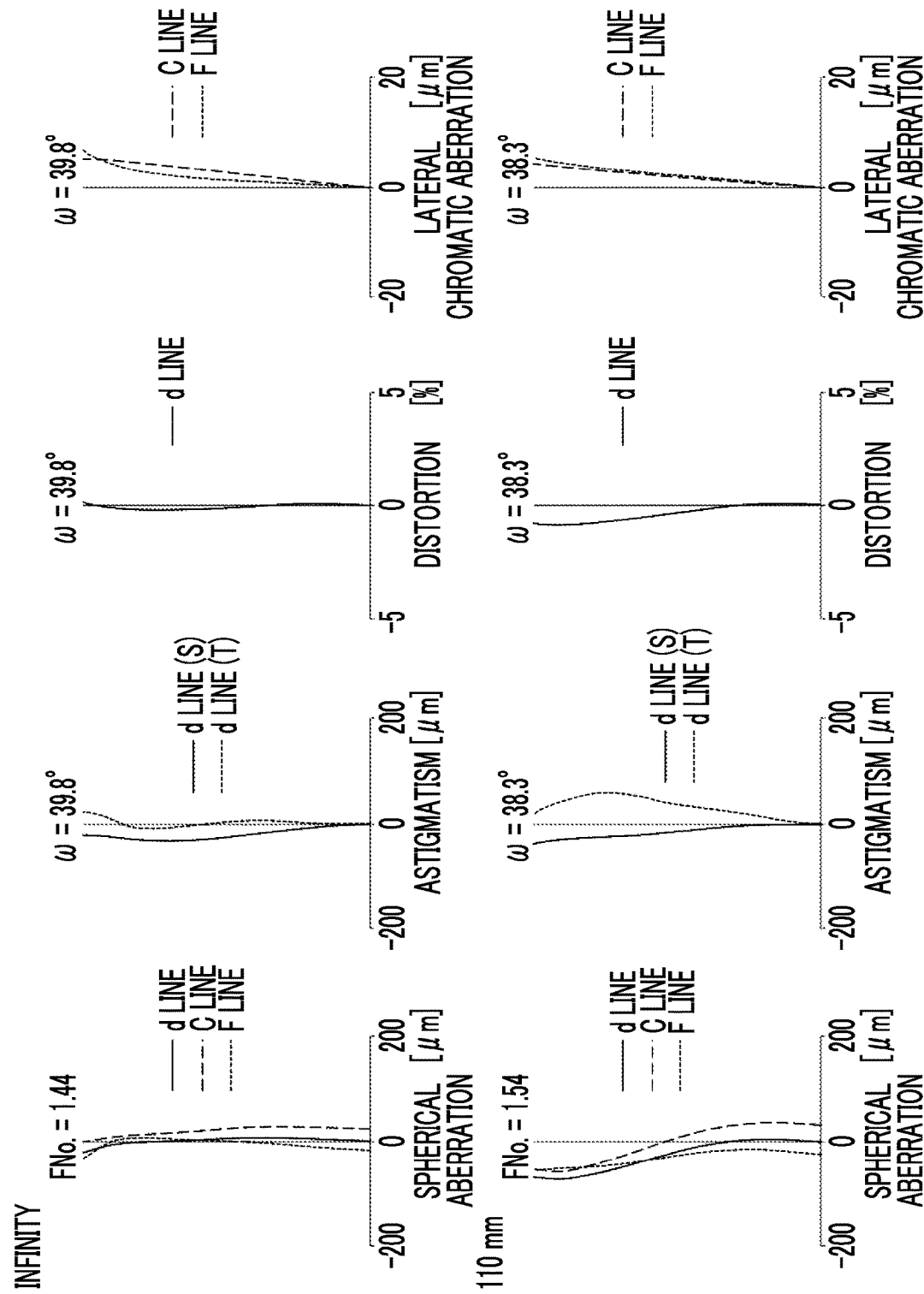
FIG. 10 shows spherical aberration diagrams, astigmatism diagrams, distortion diagrams, lateral chromatic aberration diagrams of the imaging lens of Example 3.
Figure 11:
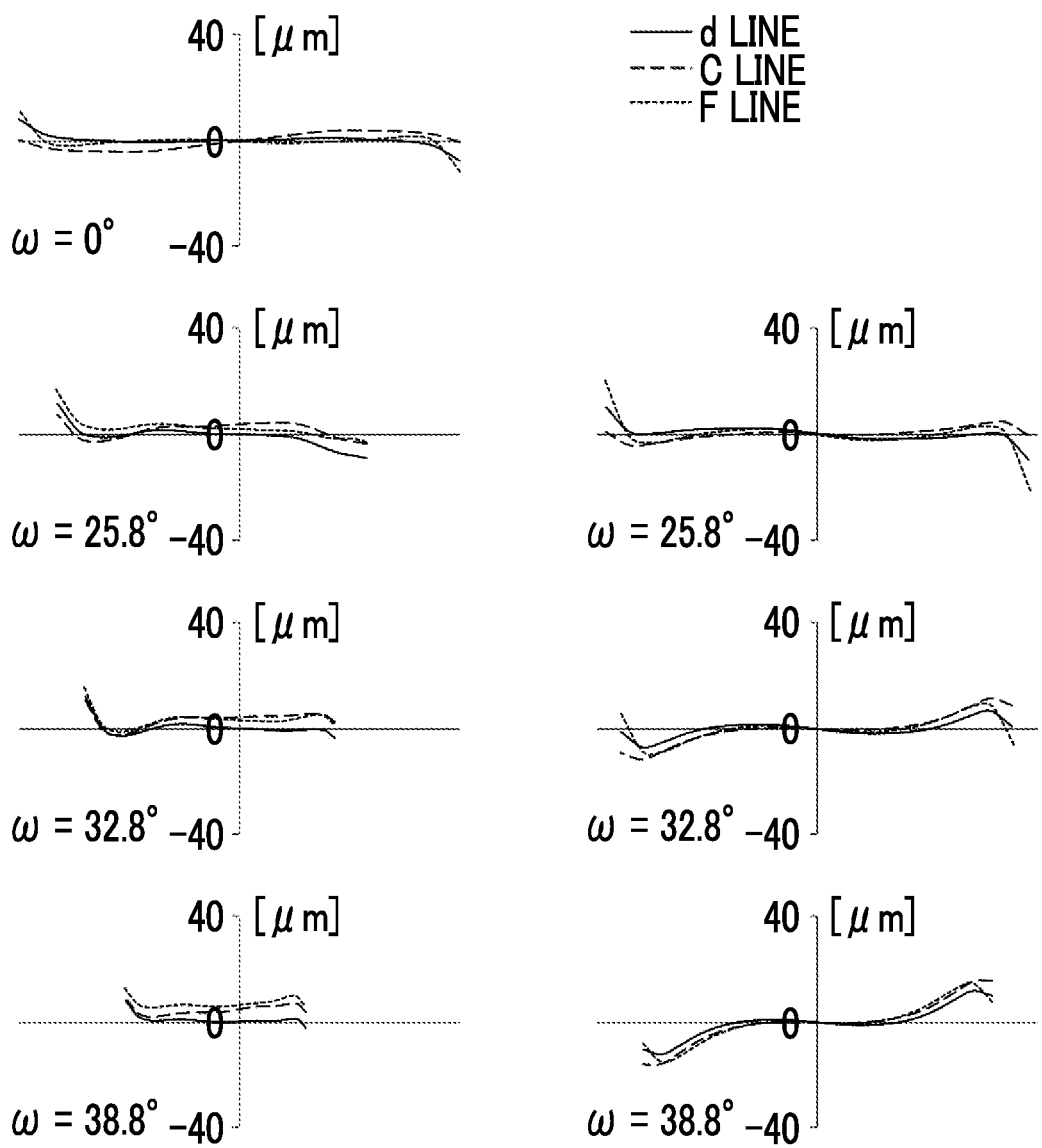
FIG. 11 shows lateral aberration diagrams of the imaging lens of Example 3 in a state where the object at infinity is in focus.
Figure 12:
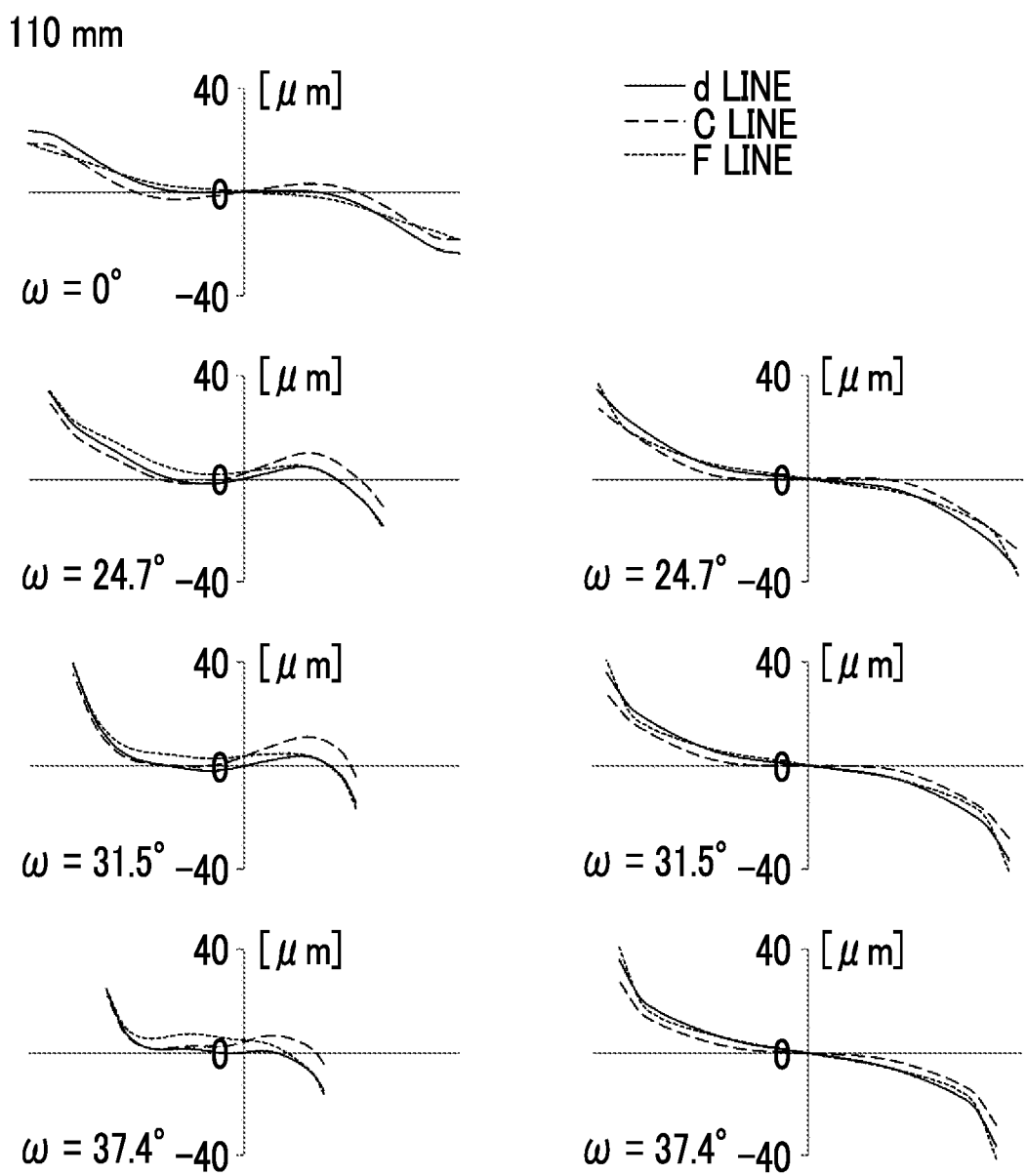
FIG. 12 shows lateral aberration diagrams of the imaging lens of Example 3 in a state where the close range object is in focus.

Regarding the imaging lens of Example 3, Table 7 shows basic lens data, Table 8 shows specification and variable surface distances, and Table 9 shows aspheric surface coefficients thereof, and FIGS. 10 to 12 each show aberration diagrams. In FIG. 10, the upper row shows spherical aberration, astigmatism, distortion, and lateral chromatic aberration, in a state where the object at infinity is in focus, and the lower row shows spherical aberration, astigmatism, distortion, and lateral chromatic aberration, in the state where the object at the object distance of 110 mm (millimeter) is in focus. FIG. 11 shows lateral aberrations in a state where the object at infinity is in focus. FIG. 12 shows lateral aberrations in a state where the object at the object distance of 110 mm (millimeters) is in focus.

TABLE 7

| | Example 3 | | | |
|---|---|---|---|---|
| S | r | d | nd | vd |
| 1 | 32.5237 | 1.7367 | 1.60342 | 38.03 |
| 2 | 18.1246 | 3.2146 | | |
| *3 | 118.2213 | 1.9376 | 1.58313 | 59.46 |
| *4 | 31.7640 | 8.7773 | | |
| 5 | −44.0686 | 1.3096 | 1.41390 | 100.82 |
| 6 | 32.2786 | 0.1000 | | |
| 7 | 28.4634 | 4.9124 | 2.00100 | 29.13 |
| 8 | −89.6905 | 1.0185 | 1.66382 | 27.35 |
| 9 | 71.1945 | 5.5368 | | |
| *10 | −30.3755 | 4.2401 | 1.58313 | 59.46 |
| 11 | −14.2487 | 1.0100 | 1.85000 | 27.03 |
| 12 | −86.3968 | 0.5147 | | |
| 13 | 85.0938 | 3.8968 | 2.00069 | 25.46 |
| 14 | −38.0093 | 2.7758 | | |
| 15(St) | ∞ | DD[15] | | |
| 16 | 28.1690 | 7.5244 | 1.59282 | 68.62 |
| 17 | −19.3899 | 0.9038 | 1.85478 | 24.80 |
| 18 | 92.6846 | 6.5358 | 1.78800 | 47.37 |
| 19 | −15.7861 | 0.9098 | 1.85478 | 24.80 |
| 20 | −137.8402 | 0.1000 | | |
| 21 | 41.5128 | 4.1040 | 2.00272 | 19.32 |
| 22 | −50.9457 | 0.4000 | | |
| *23 | 15.2198 | 1.3471 | 1.83441 | 37.28 |
| *24 | 10.3108 | DD[24] | | |
| 25 | 675.7519 | 1.8011 | 1.81600 | 46.62 |
| 26 | −87.9022 | 0.9767 | 1.84666 | 23.78 |
| 27 | 445.1891 | 8.6971 | | |
| 28 | ∞ | 2.8500 | 1.51680 | 64.20 |
| 29 | ∞ | 1.1000 | | |

TABLE 8

| | Example 3 | |
|---|---|---|
| Object Distance | Infinity | 110 mm |
| f | 17.65 | 17.47 |
| FNo. | 1.44 | 1.54 |
| 2ωmax(°) | 79.6 | 76.6 |
| Y | 14.2 | 14.2 |
| DD[15] | 7.46 | 5.00 |
| DD[24] | 6.69 | 9.16 |

TABLE 9

| | Example 3 | | |
|---|---|---|---|
| S | 3 | 4 | 10 |
| KA | −1.2442500E+00 | −2.4913659E+00 | 1.6776334E+00 |
| A3 | 0.0000000E+00 | 0.0000000E+00 | 0.0000000E+00 |
| A4 | 2.3771598E−04 | 2.5856714E−04 | −1.0765813E−06 |
| A5 | −1.2607488E−05 | −9.0050605E−06 | −5.6964828E−07 |
| A6 | 1.4241661E−08 | −1.7847991E−07 | −9.1209489E−07 |
| A7 | 5.0997323E−09 | −5.3953930E−08 | 4.1223932E−07 |
| A8 | −1.6937865E−09 | 1.9709031E−08 | −7.8584313E−08 |
| A9 | 4.9416757E−10 | −3.1829110E−09 | 7.1809552E−09 |
| A10 | −4.3828231E−11 | 2.7740065E−10 | −1.3611121E−10 |
| A11 | 2.1620693E−12 | −7.5091993E−12 | −4.2233166E−11 |

TABLE 9-continued

Example 3

| | | | |
|---|---|---|---|
| A12 | −4.7088064E−14 | −5.6930575E−13 | 4.4620280E−12 |
| A13 | −6.5700378E−15 | 4.4609993E−14 | 9.1541757E−15 |
| A14 | 7.6202549E−16 | −7.1708391E−16 | −3.6295381E−14 |
| A15 | −3.0917130E−17 | −2.4032121E−17 | 2.7958673E−15 |
| A16 | 4.5073788E−19 | 7.7317408E−19 | −6.9292382E−17 |

| S | 23 | 24 |
|---|---|---|
| KA | −6.5436100E−01 | −4.3424382E−01 |
| A3 | 0.0000000E+00 | 0.0000000E+00 |
| A4 | −1.9290291E−04 | −1.1433926E−04 |
| A5 | −1.9044850E−06 | −1.4513853E−05 |
| A6 | 5.8920955E−07 | 3.8719978E−06 |
| A7 | −1.0931297E−08 | −3.4663182E−07 |
| A8 | 2.8026172E−10 | −5.7906950E−09 |
| A9 | 7.6219137E−10 | 5.0763868E−09 |
| A10 | −6.9429731E−11 | −6.7452922E−11 |
| A11 | 1.7070329E−12 | −7.0887086E−11 |
| A12 | −5.9103796E−13 | 4.0732254E−12 |
| A13 | 9.3853193E−15 | 4.7558996E−13 |
| A14 | 9.5615292E−15 | −7.0220622E−14 |
| A15 | −7.8178735E−16 | 3.5201965E−15 |
| A16 | 1.8080420E−17 | −6.7534974E−17 |

Table 10 shows the corresponding values of Conditional Expressions (1) to (10) of the imaging lenses of Examples 1 to 3.

TABLE 10

| Expression Number | | Example 1 | Example 2 | Example 3 |
|---|---|---|---|---|
| (1) | rF/Y | 1.14 | 0.90 | 1.07 |
| (2) | (rF − rR)/(rF + rR) | 0.19 | 0.20 | 0.19 |
| (3) | (rRR + rF)/(rRR − rF) | 0.47 | 0.63 | 0.54 |
| (4) | TL2/Y | 1.59 | 1.56 | 1.54 |
| (5) | r1F/f | −0.78 | −1.04 | −0.81 |
| (6) | ν1 | 25.43 | 27.79 | 27.03 |
| (7) | ν2 | 19.32 | 18.90 | 19.32 |
| (8) | f2/f1 | 0.20 | 0.16 | 0.17 |
| (9) | fL1/fL2 | 1.43 | 1.14 | 0.95 |
| (10) | νmax − νmin | 44.98 | 42.65 | 73.80 |

The imaging lenses of Examples 1 to 3 each have an F number smaller than 1.5 and a maximum angle of view of 75 degrees or more in a state where the object at infinity is in focus. As described above, the imaging lenses of Examples 1 to 3 each achieve reduction in weight and size of the focus group while having a small F number and a large angle of view. Thus, there is less fluctuation in aberration during focusing, and aberrations are satisfactorily corrected. As a result, high optical performance is achieved.

Figure 13:
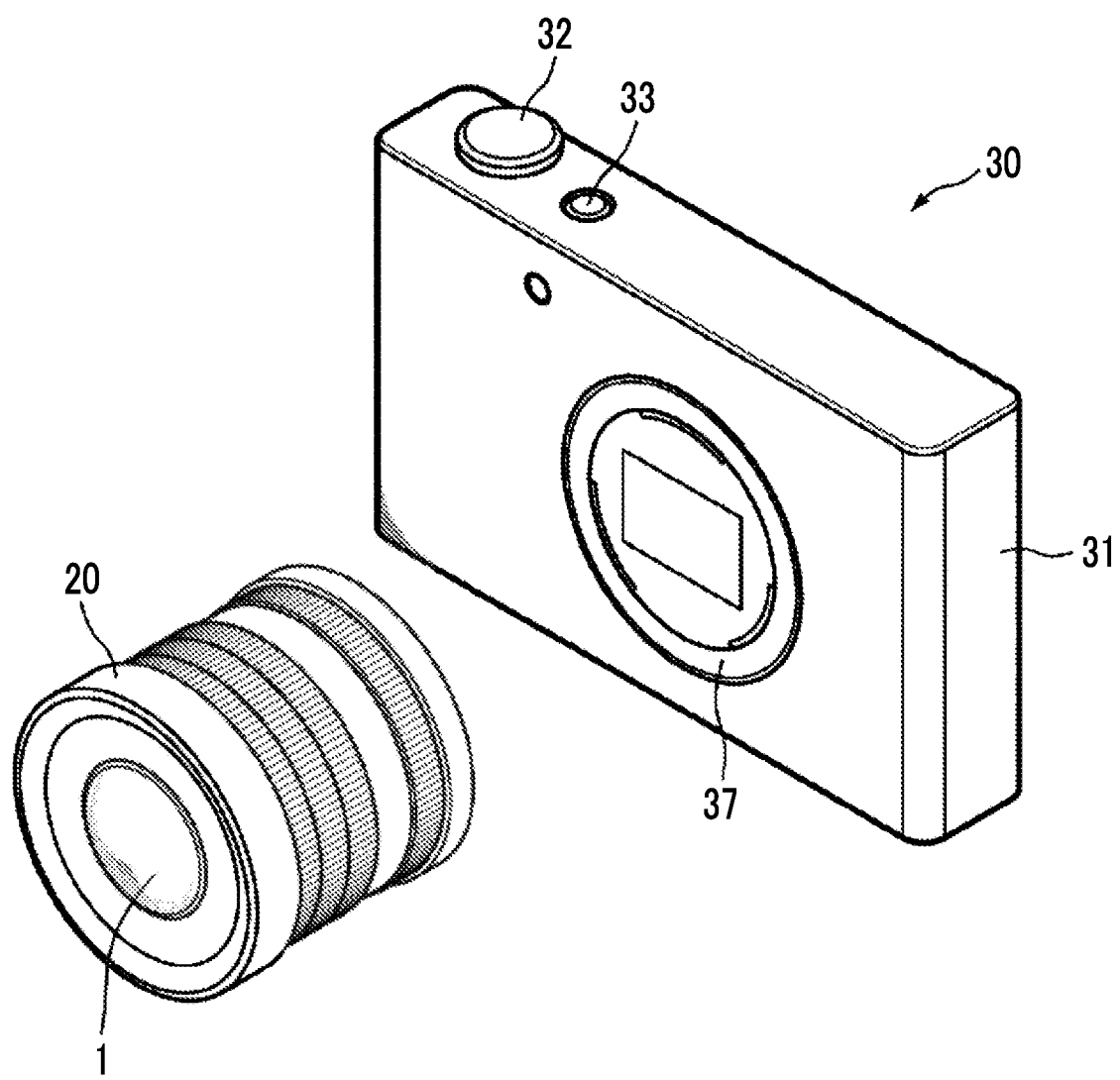
FIG. 13 is a perspective view of the front side of an imaging apparatus according to an embodiment.
Figure 14:
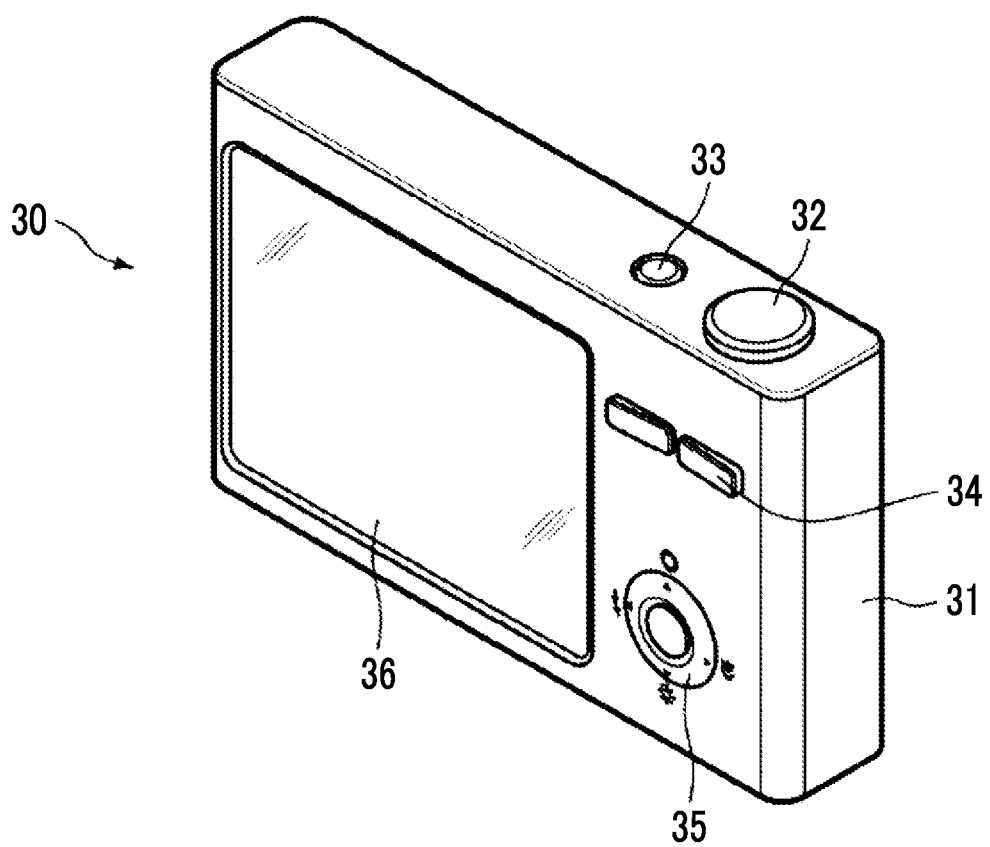
FIG. 14 is a perspective view of the rear side of the imaging apparatus according to the embodiment.

Next, an imaging apparatus according to an embodiment of the present disclosure will be described. FIGS. 13 and 14 are external views of a camera 30 which is the imaging apparatus according to the embodiment of the present disclosure. FIG. 13 is a perspective view of the camera 30 viewed from the front side, and FIG. 14 is a perspective view of the camera 30 viewed from the rear side. The camera 30 is a so-called mirrorless type digital camera, and the interchangeable lens 20 can be detachably attached thereto. The interchangeable lens 20 is configured to include the imaging lens 1, which is housed in a lens barrel, according to an embodiment of the present disclosure.

The camera 30 comprises a camera body 31, and a shutter button 32 and a power button 33 are provided on an upper surface of the camera body 31. Further, an operation section 34, an operation section 35, and a display section 36 are provided on a rear surface of the camera body 31. The display section 36 is able to display a captured image and an image within an angle of view before imaging.

An imaging aperture, through which light from an imaging target is incident, is provided at the center on the front surface of the camera body 31. A mount 37 is provided at a position corresponding to the imaging aperture. The interchangeable lens 20 is mounted on the camera body 31 with the mount 37 interposed therebetween.

In the camera body 31, there are provided an imaging element, a signal processing circuit, a storage medium, and the like. The imaging element such as a charge coupled device (CCD) or a complementary metal oxide semiconductor (CMOS) outputs a captured image signal based on a subject image which is formed through the interchangeable lens 20. The signal processing circuit generates an image through processing of the captured image signal which is output from the imaging element. The storage medium stores the generated image. The camera 30 is able to capture a still image or a video by pressing the shutter button 32, and is able to store image data, which is obtained through imaging, in the storage medium.

The technology of the present disclosure has been hitherto described through embodiments and examples, but the technology of the present disclosure is not limited to the above-mentioned embodiments and examples, and may be modified into various forms. For example, values such as the radius of curvature, the surface distance, the refractive index, the Abbe number, and the aspheric surface coefficient of each lens are not limited to the values shown in the examples, and different values may be used therefor.

Further, the imaging apparatus according to the embodiment of the present disclosure is not limited to the above example, and may be modified into various forms such as a camera other than the mirrorless type, a film camera, and a video camera.

What is claimed is:

1. An imaging lens comprising, successively in order from a position closest to an object side to an image side: a first lens group; and a second lens group that has a positive refractive power,
   wherein during focusing, the first lens group remains stationary with respect to an image plane, and only the second lens group moves,
   a lens closest to the image side in the second lens group is a negative meniscus lens having a surface convex toward the object side,
   assuming that
     a paraxial radius of curvature of an object side surface of the negative meniscus lens of the second lens group is rF, and
     a height measured from an optical axis to a top of an image is Y,
     Conditional Expression (1) is satisfied, which is represented by $$0.5 < rF/Y < 3 \tag{1},$$

a lens closest to the object side in the first lens group is a negative meniscus lens having a surface convex toward the object side,
   assuming that
     a focal length of the first lens group is f1, and
     a focal length of the second lens group is f2,
     Conditional Expression (8) is satisfied, which is represented by $$0.05 < f2/f1 < 0.32 \tag{8}, \text{ and}$$

assuming that a paraxial radius of curvature of an image side surface of the negative meniscus lens of the second lens group is rR, Conditional Expression (2) is satisfied, which is represented by $$0.06 < (rF-rR)/(rF+rR) < 0.27 \quad (2).$$

2. The imaging lens according to claim 1, wherein assuming that a paraxial radius of curvature of an image side surface of a lens which is second from the image side in the second lens group is rRR, Conditional Expression (3) is satisfied, which is represented by $$0.35 < (rRR+rF)/(rRR-rF) < 1 \quad (3).$$

3. The imaging lens according to claim 1, wherein assuming that a distance on an optical axis from a lens surface closest to the object side in the second lens group to a lens surface closest to the image side in the second lens group is TL2, Conditional Expression (4) is satisfied, which is represented by $$1.2 < TL2/Y < 2 \quad (4).$$

4. The imaging lens according to claim 1,
wherein the first lens group includes at least one negative lens, and
a negative lens closest to the image side among negative lenses included in the first lens group is a negative meniscus lens having a surface convex toward the image side.

5. The imaging lens according to claim 4, wherein assuming that
a paraxial radius of curvature of an object side surface of the negative lens closest to the image side among the negative lenses included in the first lens group is r1F, and
a focal length of the imaging lens in a state where an object at infinity is in focus is f,
Conditional Expression (5) is satisfied, which is represented by $$-2.5 < r1F/f < -0.3 \quad (5).$$

6. The imaging lens according to claim 1,
wherein the first lens group includes at least one negative lens, and
assuming that an Abbe number of a negative lens closest to the image side among negative lenses included in the first lens group based on a d line is v1, Conditional Expression (6) is satisfied, which is represented by $$15 < v1 < 38 \quad (6).$$

7. The imaging lens according to claim 1,
wherein the second lens group includes at least one positive lens, and
assuming that an Abbe number of a positive lens closest to the image side among positive lenses included in the second lens group based on a d line is v2, Conditional Expression (7) is satisfied, which is represented by $$10 < v2 < 27 \quad (7).$$

8. The imaging lens according to claim 1, wherein a distance between lenses in each lens group remains stationary during focusing.

9. The imaging lens according to claim 1, further comprising a stop that remains stationary with respect to the image plane during focusing.

10. The imaging lens according to claim 1, further comprising a stop that is closer to the image side than a lens surface closest to the image side in the first lens group.

11. The imaging lens according to claim 1, wherein the second lens group includes a plurality of positive lenses.

12. The imaging lens according to claim 1, wherein the second lens group includes at least three positive lenses.

13. The imaging lens according to claim 1,
wherein the imaging lens includes at least one negative lens, and
an object side surface of a lens, which is successively disposed on the image side of a negative lens closest to the object side among negative lenses included in the imaging lens, is a concave surface.

14. The imaging lens according to claim 1, further comprising a third lens group that remains stationary with respect to the image plane during focusing.

15. The imaging lens according to claim 1,
wherein a lens closest to the object side in the first lens group is a negative lens, and
assuming that
a focal length of the negative lens closest to the object side in the first lens group is fL1, and
a focal length of a lens which is second from the object side of the first lens group is fL2,
Conditional Expression (9) is satisfied, which is represented by $$0.7 < fL1/fL2 < 2 \quad (9).$$

16. The imaging lens according to claim 1,
wherein the first lens group includes at least one negative lens, and
assuming that
a maximum value of Abbe numbers of all negative lenses included in the first lens group based on a d line is vmax, and
a minimum value of the Abbe numbers of all the negative lenses included in the first lens group based on the d line is vmin,
Conditional Expression (10) is satisfied, which is represented by $$20 < v\max - v\min < 100 \quad (10).$$

17. An imaging apparatus comprising the imaging lens according to claim 1.

18. An imaging lens comprising, successively in order from a position closest to an object side to an image side: a first lens group; and a second lens group that has a positive refractive power,
wherein during focusing, the first lens group remains stationary with respect to an image plane, and only the second lens group moves,
a lens closest to the image side in the second lens group is a negative meniscus lens having a surface convex toward the object side,
assuming that
a paraxial radius of curvature of an object side surface of the negative meniscus lens of the second lens group is rF, and
a height measured from an optical axis to a top of an image is Y,
Conditional Expression (1) is satisfied, which is represented by $$0.5 < rF/Y < 3 \quad (1),$$

the imaging lens further comprises a stop that remains stationary with respect to the image plane during focusing, the first lens group includes at least one negative lens, assuming that
- a maximum value of Abbe numbers of all negative lenses included in the first lens group based on a d line is νmax, and
- a minimum value of the Abbe numbers of all the negative lenses included in the first lens group based on the d line is νmin, Conditional Expression (10) is satisfied, which is represented by $$20 < \nu\max - \nu\min < 100 \quad (10),$$

and assuming that a paraxial radius of curvature of an image side surface of the negative meniscus lens of the second lens group is rR, Conditional Expression (2) is satisfied, which is represented by $$0.06 < (rF-rR)/(rF+rR) < 0.27 \quad (2).$$

19. An imaging lens comprising, successively in order from a position closest to an object side to an image side: a first lens group; and a second lens group that has a positive refractive power, wherein during focusing, the first lens group remains stationary with respect to an image plane, and only the second lens group moves, a lens closest to the image side in the second lens group is a negative meniscus lens having a surface convex toward the object side, assuming that
- a paraxial radius of curvature of an object side surface of the negative meniscus lens of the second lens group is rF, and
- a height measured from an optical axis to a top of an image is Y, Conditional Expression (1) is satisfied, which is represented by $$0.5 < rF/Y < 3 \quad (1),$$

the second lens group includes at least one positive lens, assuming that an Abbe number of a positive lens closest to the image side among positive lenses included in the second lens group based on a d line is ν2, Conditional Expression (7) is satisfied, which is represented by $$10 < \nu2 < 27 \quad (7),$$

and assuming that a paraxial radius of curvature of an image side surface of the negative meniscus lens of the second lens group is rR, Conditional Expression (2) is satisfied, which is represented by $$0.06 < (rF-rR)/(rF+rR) < 0.27 \quad (2).$$

* * * * *